United States Patent
Hirzallah et al.

(10) Patent No.: US 12,213,097 B2
(45) Date of Patent: *Jan. 28, 2025

(54) DATA GATHERING AND DATA SELECTION TO TRAIN A MACHINE LEARNING ALGORITHM

(71) Applicant: QUALCOMM Incorporated, San Diego, CA (US)

(72) Inventors: Mohammed Ali Mohammed Hirzallah, San Marcos, CA (US); Srinivas Yerramalli, San Diego, CA (US); Taesang Yoo, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,299

(22) Filed: Oct. 25, 2023

(65) Prior Publication Data

US 2024/0064692 A1 Feb. 22, 2024

Related U.S. Application Data

(63) Continuation of application No. 17/396,417, filed on Aug. 6, 2021, now Pat. No. 11,825,439.

(51) Int. Cl.
*H04W 64/00* (2009.01)
*G06F 18/214* (2023.01)
*H04W 72/23* (2023.01)

(52) U.S. Cl.
CPC ...... *H04W 64/003* (2013.01); *G06F 18/2155* (2023.01); *H04W 64/006* (2013.01); *H04W 72/23* (2023.01)

(58) Field of Classification Search
CPC ............ H04W 64/003; H04W 64/006; H04W 72/23; G06F 18/2155

(Continued)

(56) References Cited

U.S. PATENT DOCUMENTS

| | | | |
|---|---|---|---|
| 2020/0216025 A1 | 7/2020 | Le Bourgeois et al. |
| 2021/0072341 A1 | 3/2021 | Bocca et al. |
| 2023/0037704 A1 | 2/2023 | Hirzallah et al. |

FOREIGN PATENT DOCUMENTS

| | | |
|---|---|---|
| WO | 2019236258 A1 | 12/2019 |
| WO | 2021037231 A1 | 3/2021 |
| WO | 2021104403 A1 | 6/2021 |

OTHER PUBLICATIONS

International Search Report and Written Opinion—PCT/US2022/072591—ISA/EPO—Oct. 5, 2022.

*Primary Examiner* — Joel Ajayi
(74) *Attorney, Agent, or Firm* — QUALCOMM Incorporated

(57) ABSTRACT

Disclosed are techniques for training a position estimation module. In an aspect, a first network entity obtains a plurality of positioning measurements, obtains a plurality of positions of one or more user equipments (UEs), the plurality of positions determined based on the plurality of positioning measurements, stores the plurality of positioning measurements as a plurality of features and the plurality of positions as a plurality of labels corresponding to the plurality of features, and trains the position estimation module with the plurality of features and the plurality of labels to determine a position of a UE from positioning measurements taken by the UE.

30 Claims, 14 Drawing Sheets

(58) Field of Classification Search
USPC .................................................... 455/456.1
See application file for complete search history.

DATA GATHERING AND DATA SELECTION TO TRAIN A MACHINE LEARNING ALGORITHM

CROSS-REFERENCE TO RELATED APPLICATIONS

The present Application for Patent is a continuation of U.S. application Ser. No. 17/396,417, entitled "DATA GATHERING AND DATA SELECTION TO TRAIN A MACHINE LEARNING ALGORITHM," filed Aug. 6, 2021, assigned to the assignee hereof, and expressly incorporated herein by reference in its entirety.

BACKGROUND OF THE DISCLOSURE

1. Field of the Disclosure

Aspects of the disclosure relate generally to machine learning.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method performed by a first network entity for training a position estimation module includes obtaining a plurality of positioning measurements; obtaining a plurality of positions of one or more user equipments (UEs), the plurality of positions determined based on the plurality of positioning measurements; storing the plurality of positioning measurements as a plurality of features and the plurality of positions as a plurality of labels corresponding to the plurality of features; and training the position estimation module with the plurality of features and the plurality of labels to determine a position of a UE from positioning measurements taken by the UE.

In an aspect, a first network entity includes a memory; at least one transceiver; and at least one processor communicatively coupled to the memory and the at least one transceiver, the at least one processor configured to: obtain a plurality of positioning measurements; obtain a plurality of positions of one or more user equipments (UEs), the plurality of positions determined based on the plurality of positioning measurements; store the plurality of positioning measurements as a plurality of features and the plurality of positions as a plurality of labels corresponding to the plurality of features; and train a position estimation module with the plurality of features and the plurality of labels to determine a position of a UE from positioning measurements taken by the UE.

In an aspect, a first network entity includes means for obtaining a plurality of positioning measurements; means for obtaining a plurality of positions of one or more user equipments (UEs), the plurality of positions determined based on the plurality of positioning measurements; means for storing the plurality of positioning measurements as a plurality of features and the plurality of positions as a plurality of labels corresponding to the plurality of features; and means for training a position estimation module with the plurality of features and the plurality of labels to determine a position of a UE from positioning measurements taken by the UE.

In an aspect, a non-transitory computer-readable medium storing computer-executable instructions that, when executed by a first network entity, cause the first network entity to: obtain a plurality of positioning measurements; obtain a plurality of positions of one or more user equipments (UEs), the plurality of positions determined based on the plurality of positioning measurements; store the plurality of positioning measurements as a plurality of features and the plurality of positions as a plurality of labels corresponding to the plurality of features; and train a position estimation module with the plurality of features and the plurality of labels to determine a position of a UE from positioning measurements taken by the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
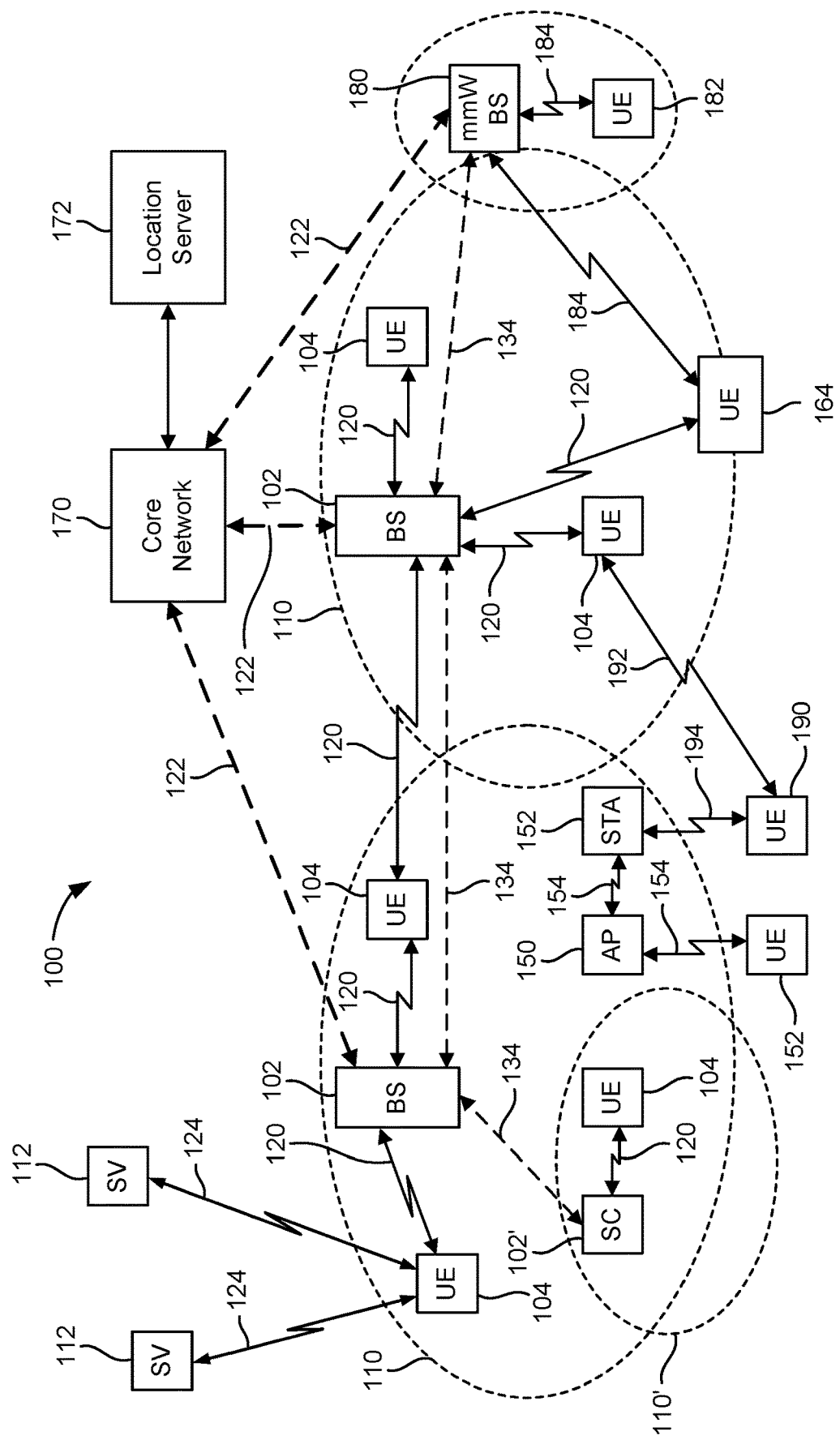
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
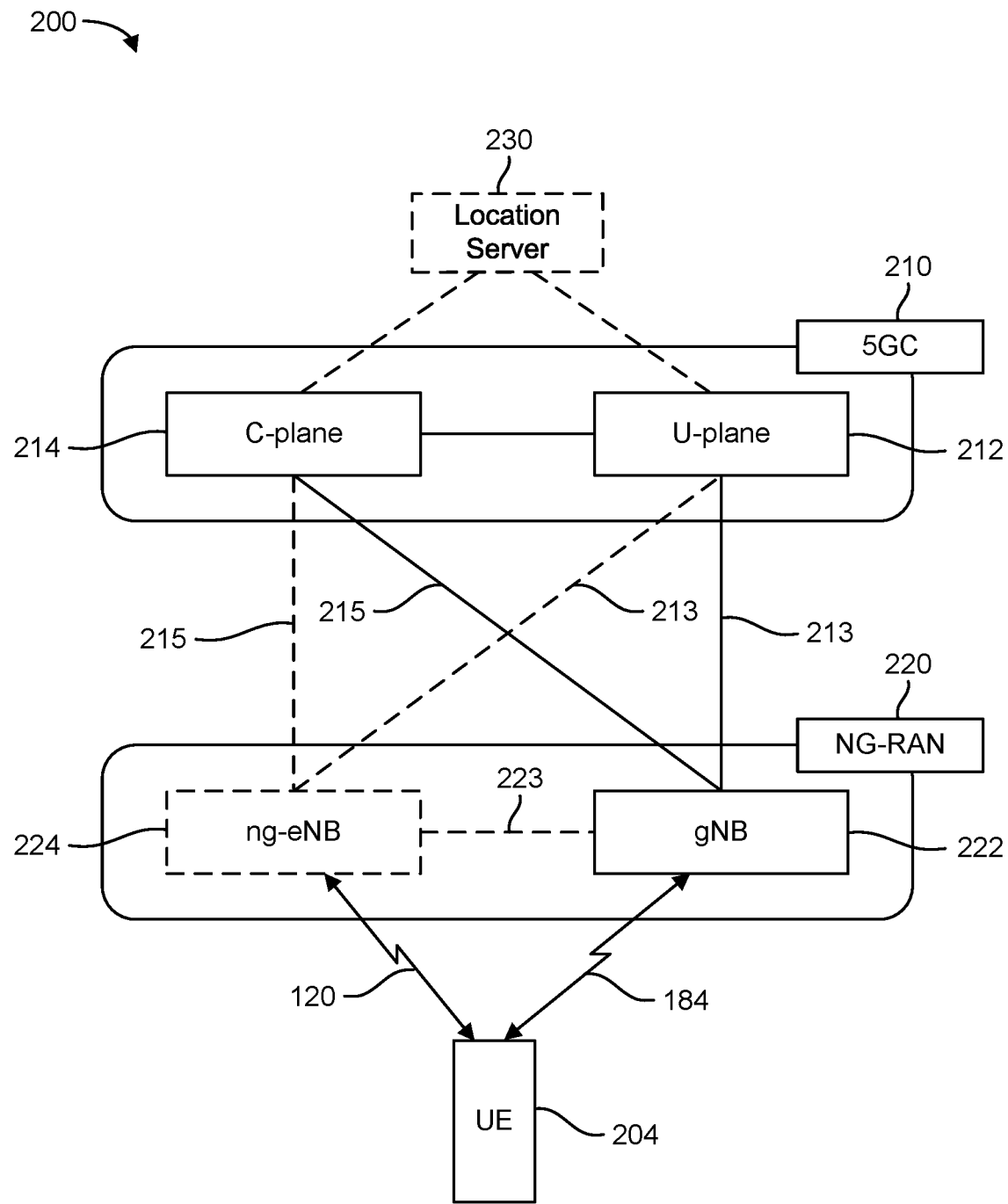
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222.

Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
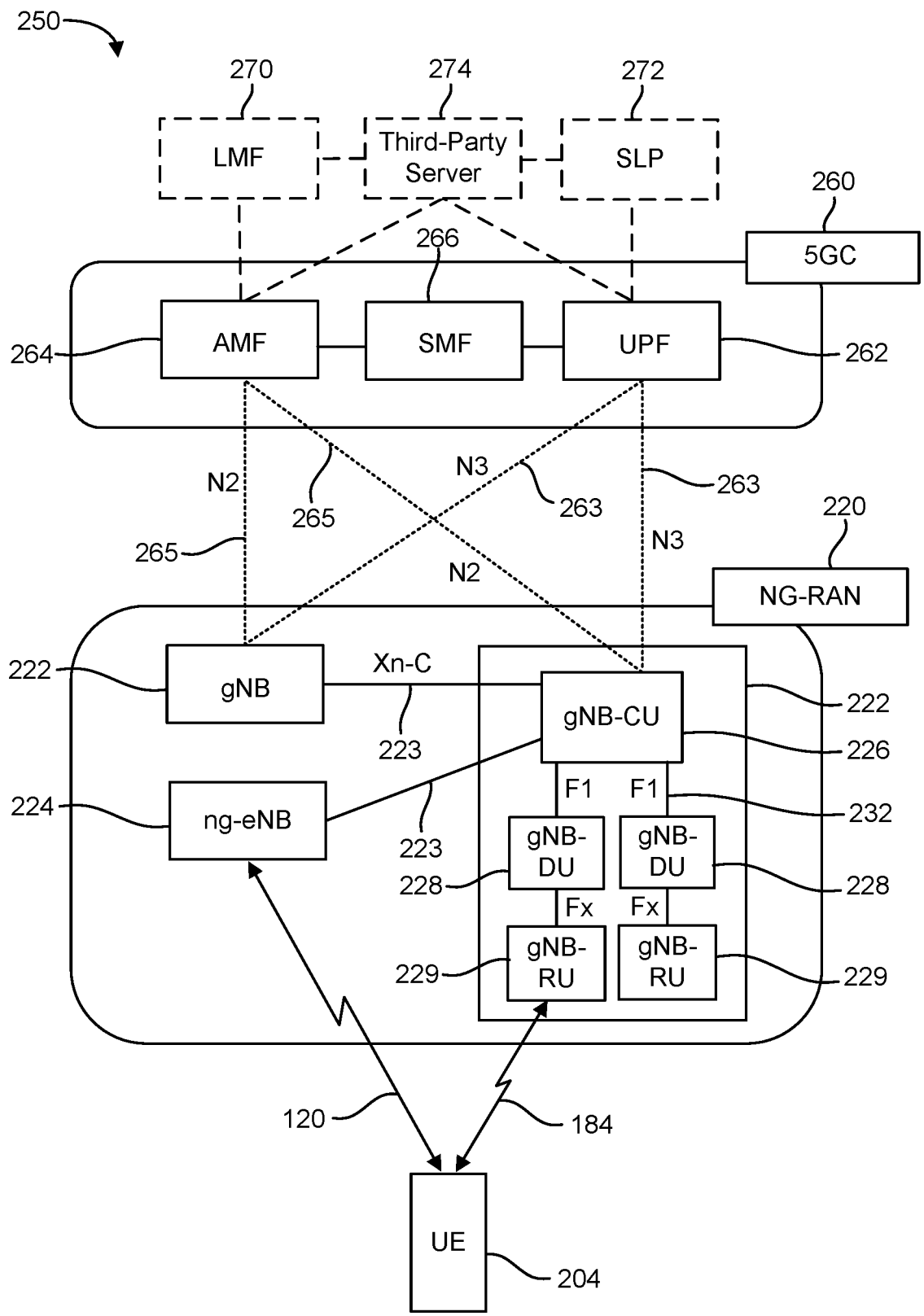

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
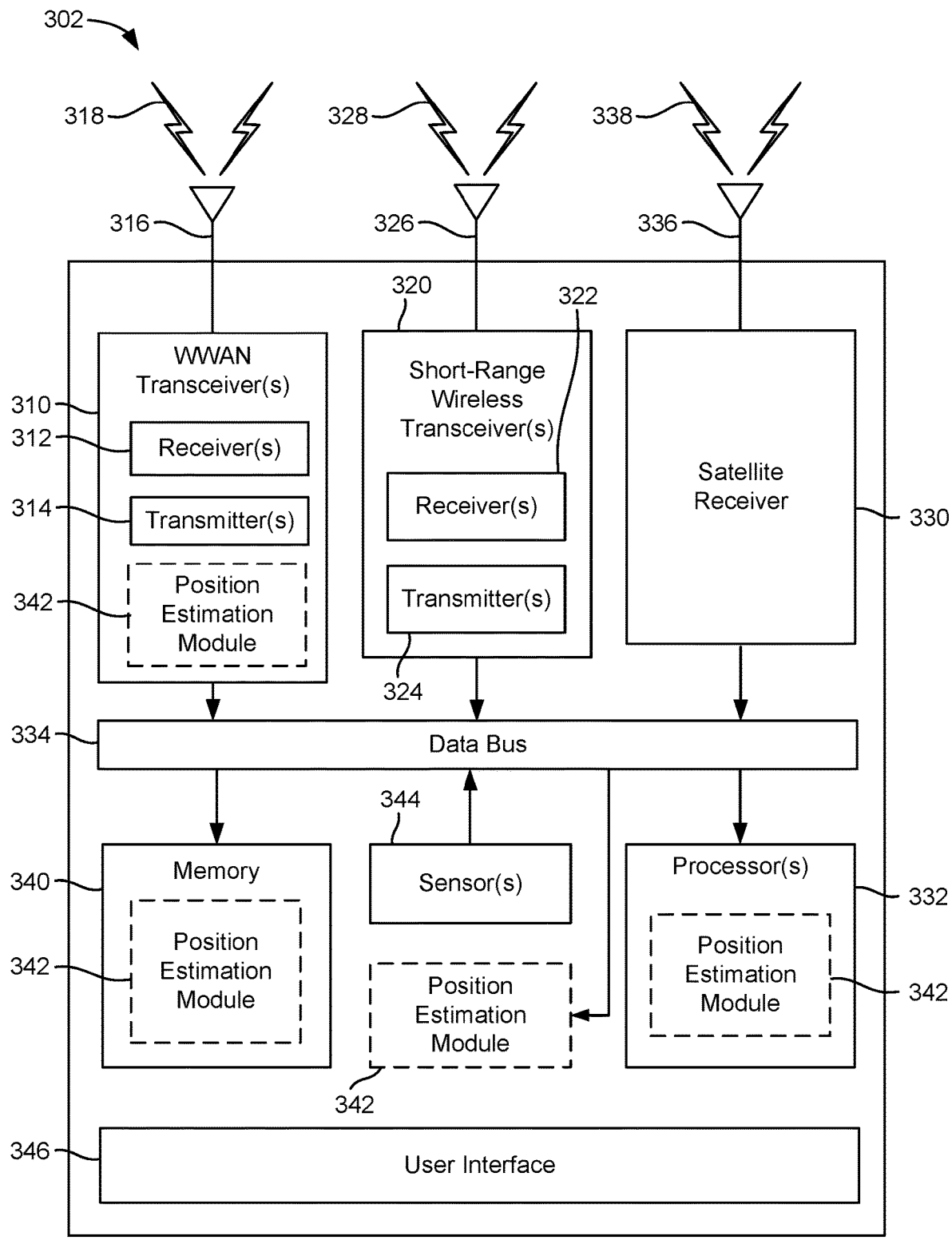
FIGS. 3A, 3B, and 3C are simplified block diagrams of several sample aspects of components that may be employed in a user equipment (UE), a base station, and a network entity, respectively, and configured to support communications as taught herein.
Figure 3B:
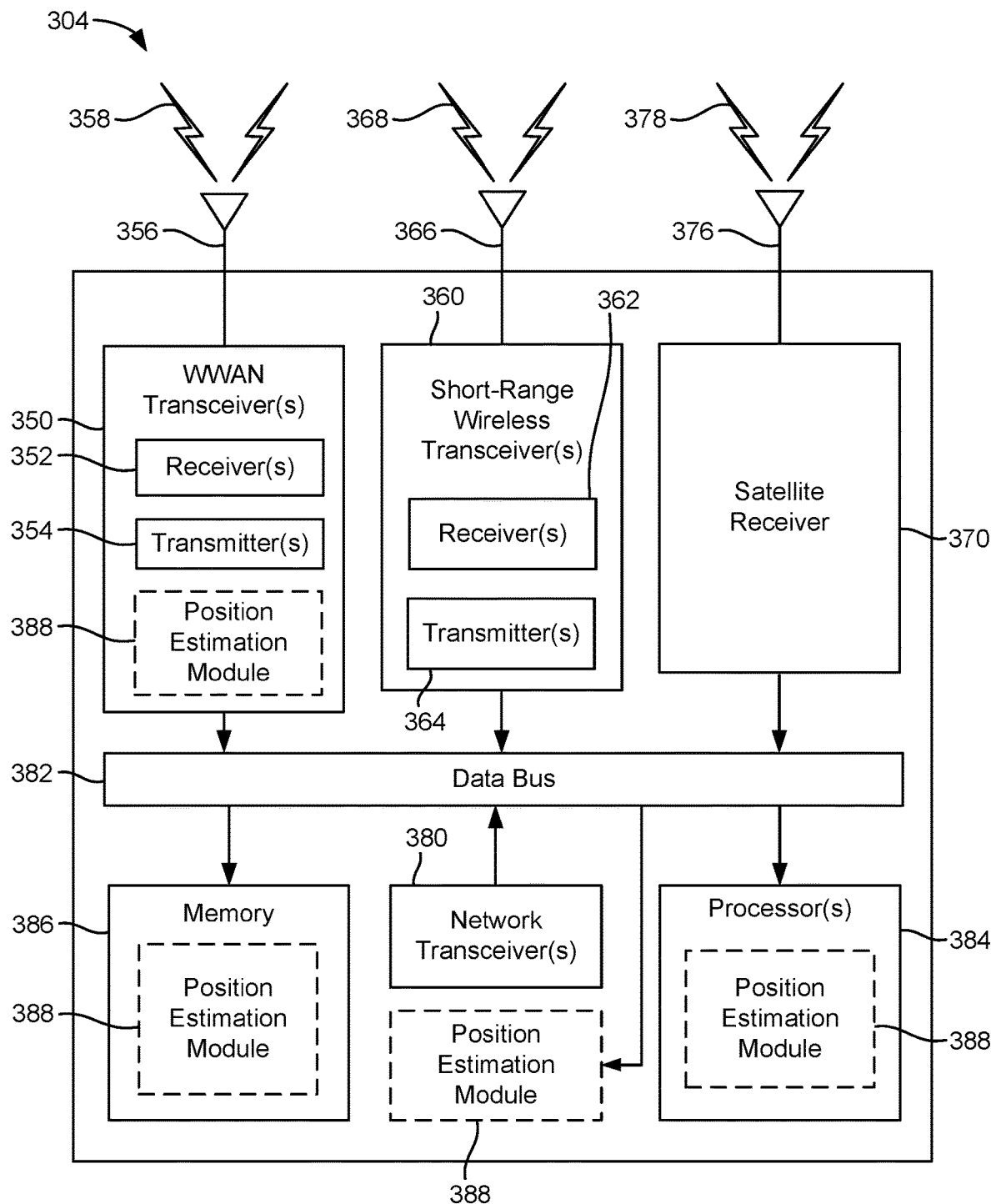
Figure 3C:
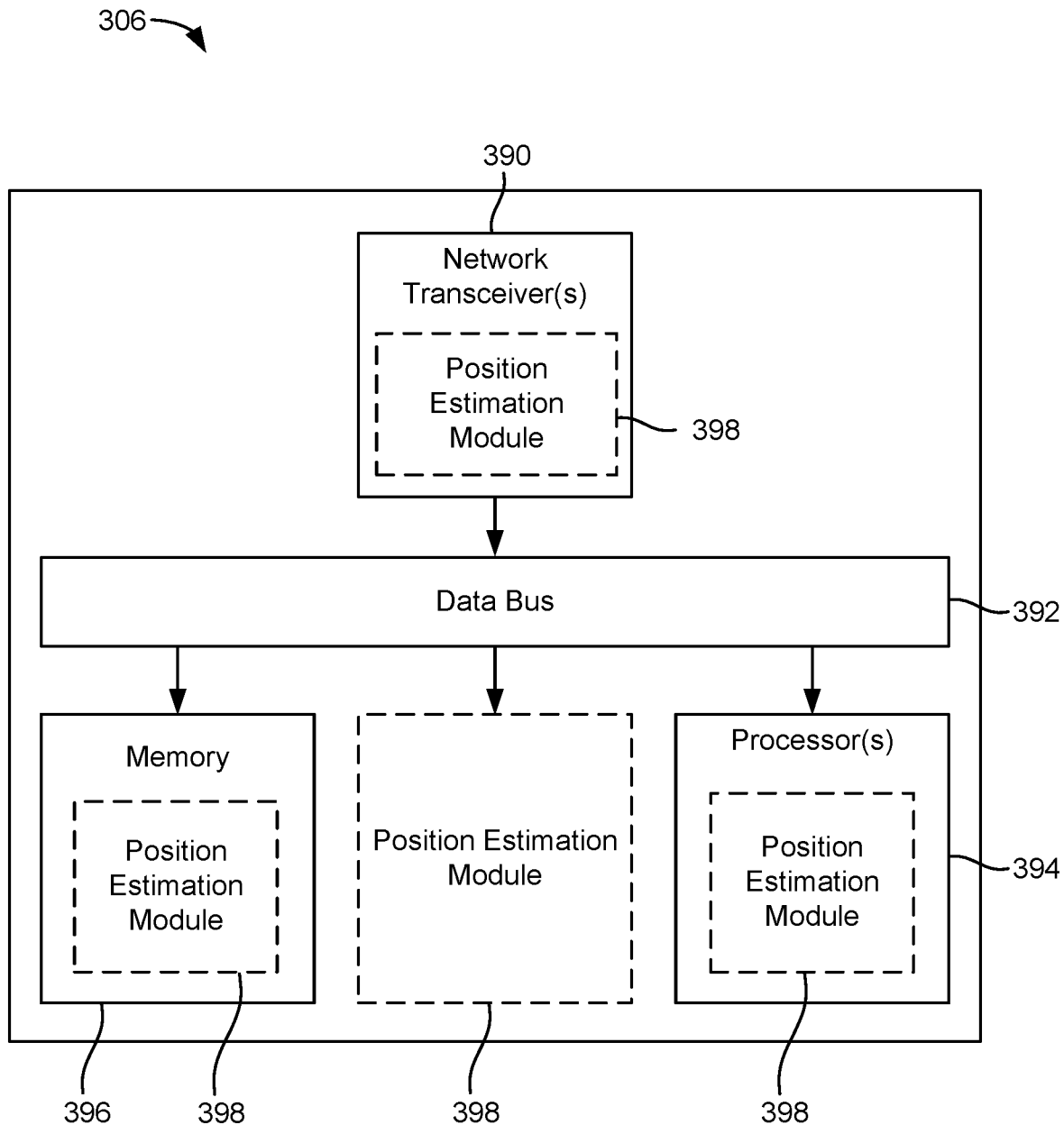

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Position Estimation Module 342, 388, and 398, respectively. The Position Estimation Module 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the Position Estimation Module 342, 388, and 398 may be external to the processors 332, 384, and 394 (e.g., part of a modem processing system, integrated with another processing system, etc.). Alternatively, the Position Estimation Module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Position Estimation Module 342, which may be, for example, part of the one or more WWAN transceivers 310, the memory 340, the one or more processors 332, or any combination thereof, or may be a standalone component. FIG. 3B illustrates possible locations of the Position Estimation Module 388, which may be, for example, part of the one or more WWAN transceivers 350, the memory 386, the one or more processors 384, or any combination thereof, or may be a standalone component. FIG. 3C illustrates possible locations of the Position Estimation Module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Position Estimation Module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
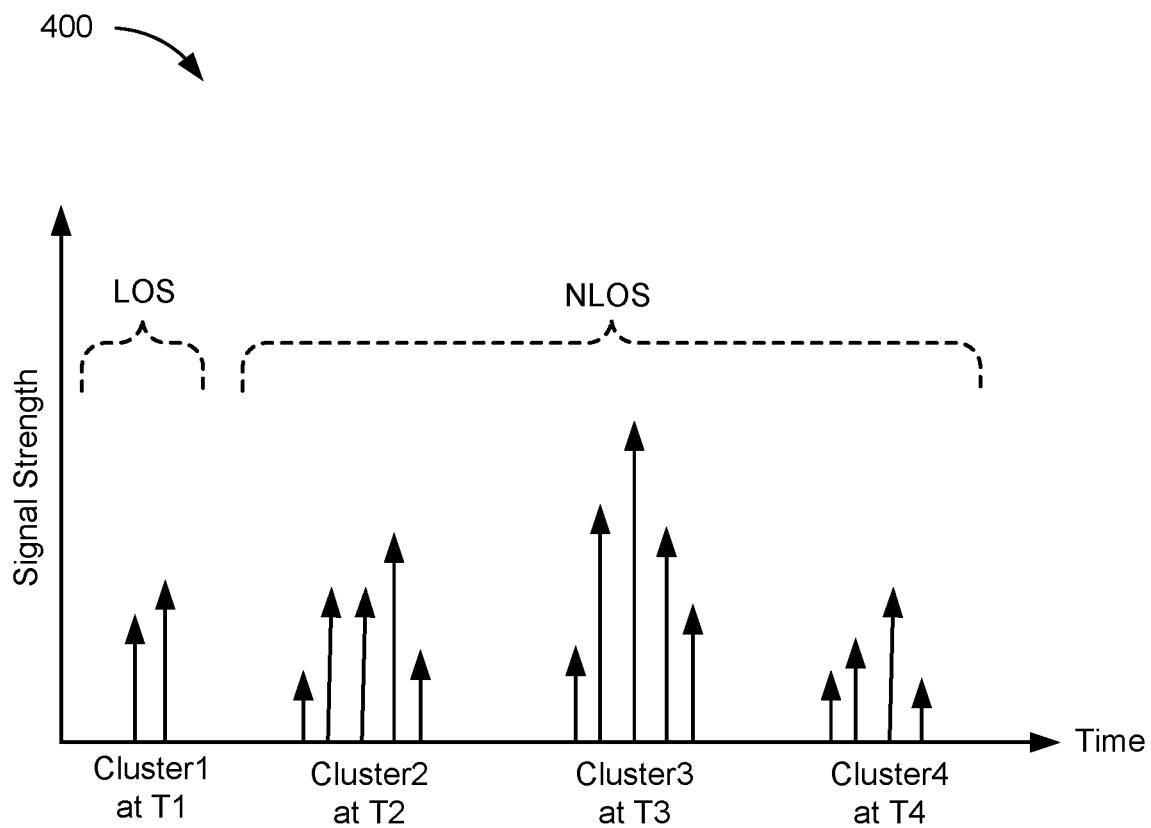
FIG. 4 is a graph showing a radio frequency (RF) channel impulse response over time, according to aspects of the disclosure.

FIG. 4 is a graph 400 illustrating the channel impulse response of a multipath channel between a receiver device (e.g., any of the UEs or base stations described herein) and a transmitter device (e.g., any other of the UEs or base stations described herein), according to aspects of the disclosure. The channel impulse response represents the intensity of a radio frequency (RF) signal received through a multipath channel as a function of time delay. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 4, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 4, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 4, because the first cluster of RF signals at time T1 arrives first, it is assumed to correspond to the RF signal transmitted on the transmit beam aligned with the LOS, or the shortest, path. The third cluster at time T3 is comprised of the strongest RF signals, and may correspond to, for example, the RF signal transmitted on a transmit beam aligned with a non-line-of-sight (NLOS) path. Note that although FIG. 4 illustrates clusters of two to five channel taps, as will be appreciated, the clusters may have more or fewer than the illustrated number of channel taps.

Machine learning may be used to generate models that may be used to facilitate various aspects associated with processing of data. One specific application of machine learning relates to generation of measurement models for processing of reference signals for positioning (e.g., PRS), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 5:
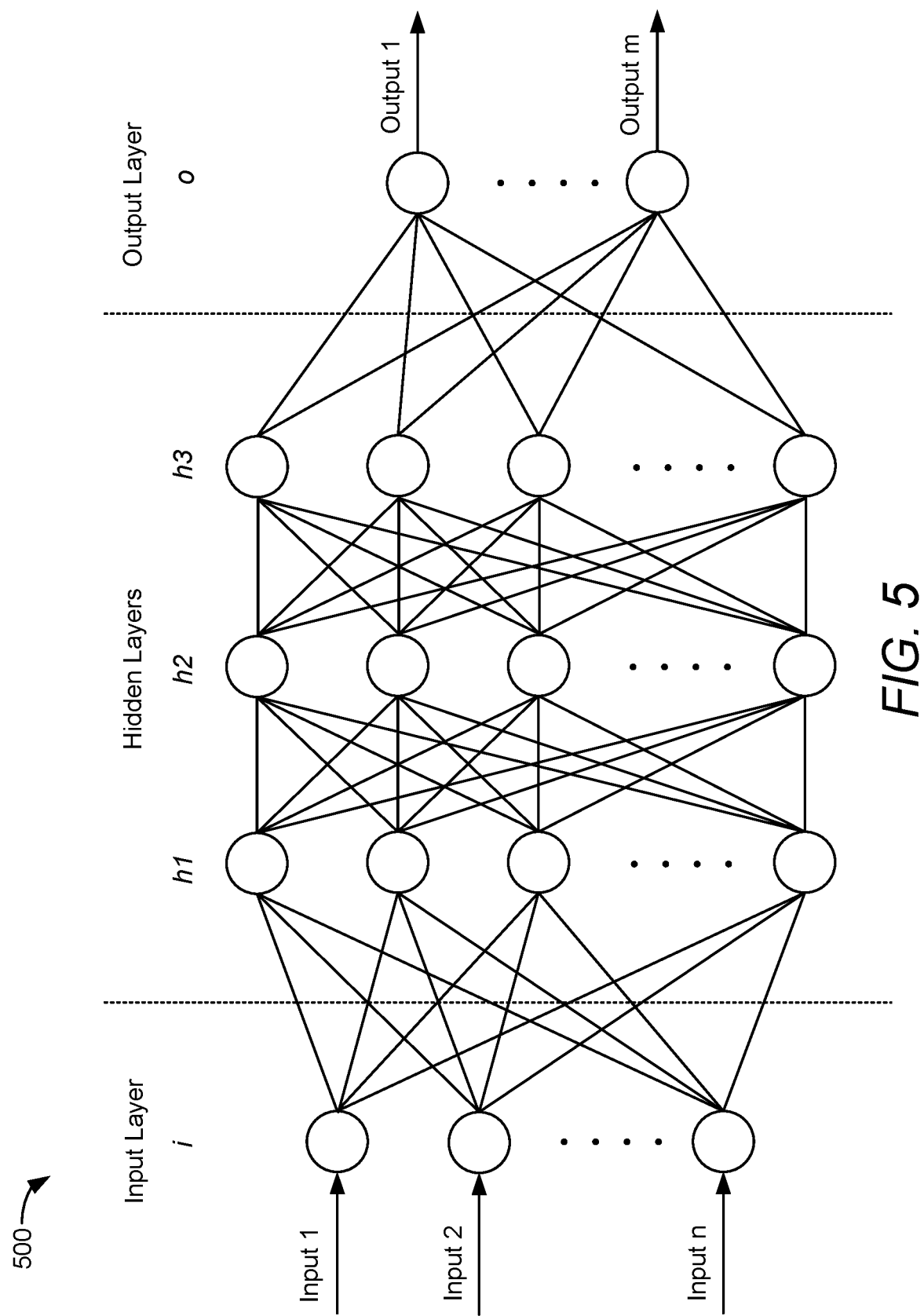
FIG. 5 illustrates an example neural network, according to aspects of the disclosure.

FIG. 5 illustrates an example neural network 500, according to aspects of the disclosure. The neural network 500 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system, such as processors 332, 384, or 394) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
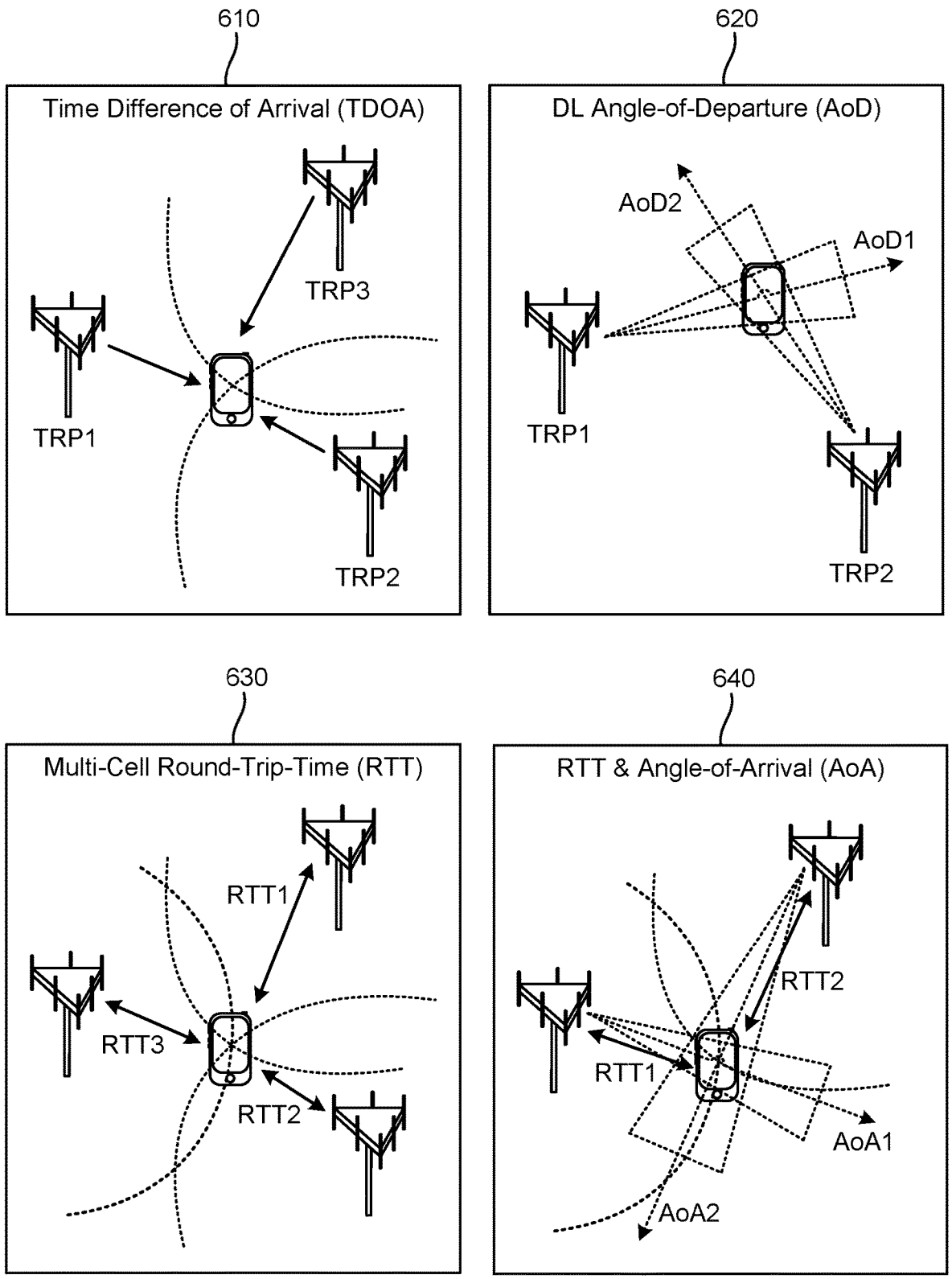
FIG. 6 illustrates examples of various positioning methods, according to aspects of the disclosure.

FIG. 6 illustrates examples of various positioning methods, according to aspects of the disclosure. In an observed time-difference of arrival (OTDOA) or downlink time-difference of arrival (DL-TDOA) positioning procedure, illustrated by scenario 610, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, illustrated by scenario 620, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, illustrated by scenario 630, a UE performs an RTT procedure with multiple base stations to enable its location to be determined (e.g., using multilateration) based on the known locations of the base stations. RTT and multi-RTT methods can be combined with other positioning techniques, such as UL-AoA, illustrated by scenario 640, and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 7:
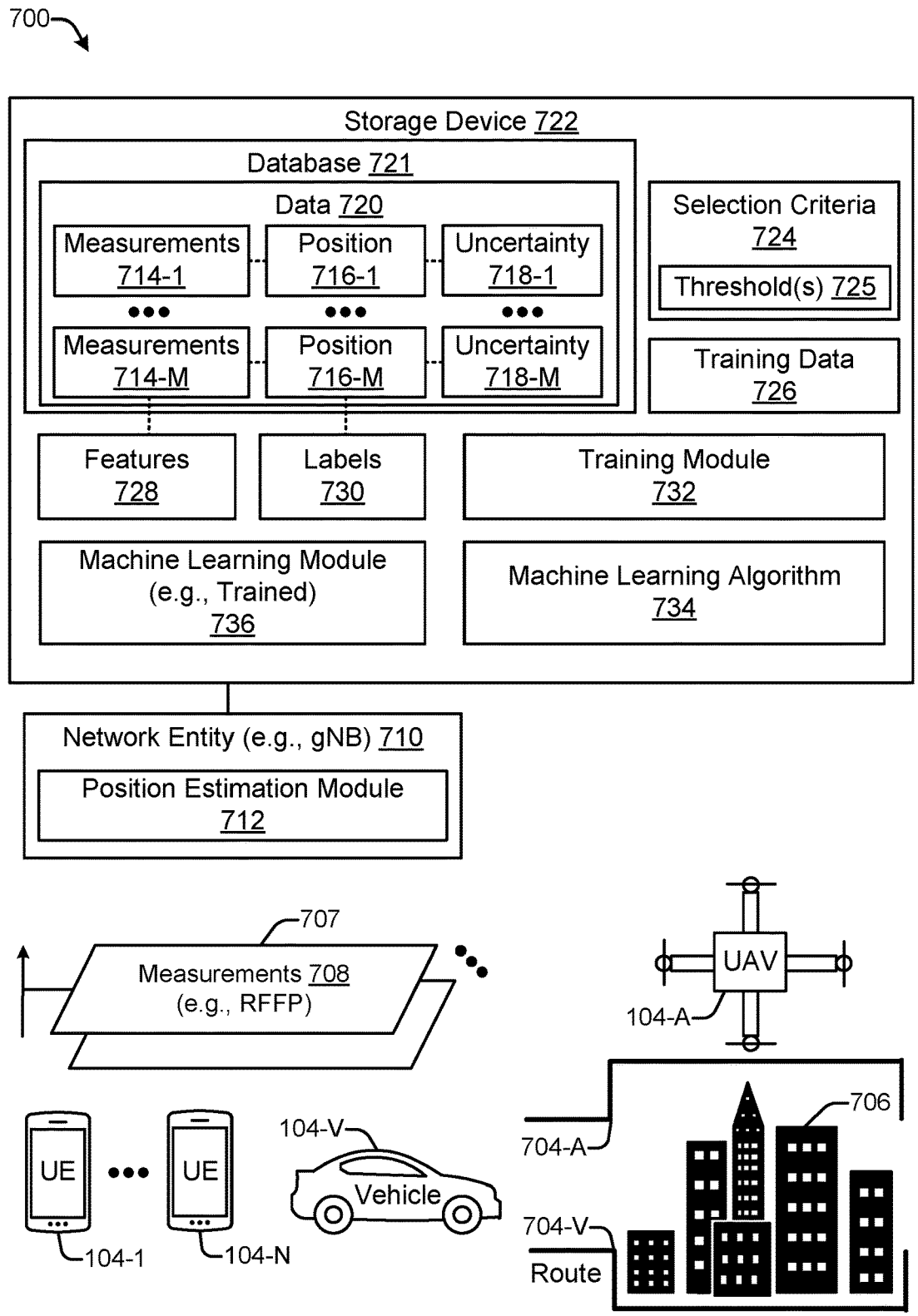
FIG. 7 illustrates an example wireless communication system to gather training data to train a machine learning algorithm, according to aspects of the disclosure.

FIG. 7 illustrates an example wireless communication system 700 to gather training data to train a machine learning algorithm, according to aspects of the disclosure. A Radio frequency fingerprint (RFFP) refers to radio frequency characteristics of a cellular radio (or other radio transmitter) that characterize the signal transmission of the cellular radio and enable the cellular radio to be identified based on transmission characteristics of the cellular radio. The RFFP are a result of differences between hardware components of transmitters and the differences that are included in communication signals. RFFP-based positioning is a positioning and localization technique that utilizes RF fingerprints (e.g., channel impulse response) captured by mobile devices (e.g., user equipment (UE)) to determine a location and position of each mobile device. In machine learning (ML) RFFP positioning, RF fingerprints and their associated positions are used as features and labels, respectively, to train a machine learning (ML) model in a supervised manner. After being trained, the ML model is used to estimate positions based on newly captured RFFPs. ML position training can be used by the user equipment (UE), by network entities (e.g., gNB), or both. ML supervised training uses accurate labels (e.g., true positions). The systems and techniques described herein obtain accurate labels using classical positioning techniques to estimate position. FIG. 7 illustrates generating labels for ML-based positioning using classical positioning techniques and use the labels to train an ML module. The RFFP is associated with a cell identifier (ID) or a transmission and reception point (TRP) ID.

The systems and techniques described herein are not restricted to a particular entity (e.g., LMF) and may be implemented on UEs or on the base station side (e.g., DU or CU). There are multiple options for selecting measurements that are based on comparing an uncertainty metric with a predefined threshold. An example of uncertainty metric may be a post-covariance obtained after Kalman filtering. The thresholds may be chosen based on the required confidence. Multiple model instances may be trained based on each device type and each device's capabilities and requested positioning accuracy. For example, the systems and techniques described herein may be used to train multiple model instances with training samples selected based on different thresholds. Multiple trained models may be used for positioning across the network. In some cases, specific models may be trained (e.g., fine-tuned) to address specific positioning scenarios.

The system 700 includes multiple UEs 104-1 to 104-N, including one or more vehicles, such as a representative vehicle 104-V, and one or more unmanned aerial vehicles (UAVs), such as a representative UAV 104-A. In some aspects, the representative vehicle 104-V may be an autonomous ground vehicle (AGV) or the like. The UAV 104-A, also known as a drone, is an aircraft without any human pilot, crew, or passengers on board. The UAV 104-A is a component of an unmanned aircraft system (UAS). Besides the UAV 104-A, the UAS includes a ground-based controller and a wireless communication system that is used by the controller to communicate with the UAV 104-A. The vehicle 104-V may travel one or more ground-based routes, such as a representative ground route 704-V. The UAV 104-A may travel one or more aerial routes, such as a representative aerial route 704-A. The routes 704 (e.g., referring to both 704-V and 704-A) may include one or more landmarks 706 (e.g., buildings, monuments, statues, and the like) whose positions are well-known. For example, the routes 704 may include the landmark 706, such as, the Empire State building In New York City, the Seattle space needle in Seattle, the Willis Tower (formerly the Sears Roebuck Tower) in Chicago, or another well-known landmark whose position is well known. Of course, the routes 704 may include landmarks 706 for whom the corresponding position is not known. For example, a recently constructed building may not have a known position. The term position refers to coordinates describing a location ("position") of an object in three-dimensional space, such as, Cartesian coordinates (e.g., x-axis, y-axis, z-axis), latitude, longitude, and altitude, polar coordinates, spherical coordinates, or another type of three-dimensional coordinate system. In some aspects, the systems and techniques described herein may use a spherical coordinate system for three-dimensional space in which the position of a point is specified by three numbers: (1) a radial distance of a point from a fixed origin, (2) a polar angle measured from a fixed zenith direction, and (3) an azimuthal angle of an orthogonal projection on a reference plane that passes through the origin and is orthogonal to the zenith, measured from a fixed reference direction on the plane. While traveling the routes 704, the vehicle 104-V and the UAV 104-A may capture and transmit a measurement message 707 that includes measurements 708, such as a RFFP. Multiple user equipment (UE), such as the UE 104-1 to UE 104-N (where N>0), may capture and transmit the measurements 708 of objects, including the landmarks 706. The UEs 104 may capture and transmit the measurements 708 associated with fixed (e.g., unmovable) objects as well as moving objects (e.g., pedestrians, vehicles, and the like).

The measurements 708 transmitted by the UEs 104 may be received by a representative network entity 710, such as, a gNB, an LMF, a network-accessible server, a training accelerator, disaggregated portions of the gNB/TRP (e.g., radio unit (RU), centralized unit (CU), or distributed unit (DU)), and/or a TRP. The measurements 708 may include channel impulse response (CIR), channel frequency response (CFR), normalized histogram of radio measurements, another type of measurement, or any combination thereof. CIR is the output of a dynamic system when presented with a brief input signal, known as an impulse. CFR is the frequency response of a channel. In a normalized histogram, each column in a cumulative histogram is computed as the sum of all the histogram values and then scaled so that the final value is 1.0. The network entity 710 may use a position estimation module 712 to determine a corresponding position associated with (and based on) the measurements 708. For example, the position estimation module 712 may use time difference of arrival (TDOA, as described in FIG. 6), time-of-flight (ToF), Chan's method, Taylor's method, Kalman filter-based methods (e.g., Iterative Extended Kalman filter (IEKF), simultaneous localization and mapping (SLAM) techniques, another type of position determination technique, or any combination thereof. Time of arrival (ToA) is the absolute time instant when a radio signal transmitted from a transmitter reaches a remote receiver. The time span elapsed from the time of transmission (ToT) is the time of flight (ToF). The Time difference of arrival (TDOA) is the difference between TOAs. Chan's method is a non-iterative technique to perform hyperbolic position-estimation. A Kalman filter, also known as linear quadratic estimation (LQE), uses a series of measurements observed over time, containing statistical noise and other inaccuracies, and produces estimates of unknown variables that tend to be more accurate than those based on a single measurement alone, by estimating a joint probability distribution over the variables for each timeframe. IEKF adds iterative operations to a Kalman filter to reduce bias and estimation error. SLAM constructs or updates a map of an unknown environment while simultaneously keeping track of an agent's location within the unknown environment.

For measurements 714-1 to 714-M (where M>0), the position estimation module 712 may determine corresponding positions 716-1 to 716-M, respectively. The position estimation module 712 may determine an uncertainty 718-1 to 718-M corresponding to the measurements 714-1 to 714-M, respectively. The uncertainty 718 may indicate an accuracy associated with the corresponding position 716. For example, the uncertainty 718 may be based, at least in part, on the type of measurement 714 and the particular technique used by the position estimation module 712 to determine the position 716. To illustrate, some types of measurements and some positioning techniques may be more precise than other types of measurements and other positioning techniques. A relatively low uncertainty 718 may indicate that the corresponding position 716 has a relatively high degree of certainty (e.g., accuracy). Each of the measurements 714, the associated position 716, and the associated uncertainty 718 may be stored as data 720 in a database 721 in a storage device 722 that is accessible to the network entity 710. The storage device 722 may be random access memory, a storage drive (e.g., disk-based storage drive, solid state drive (SSD) or the like), another type of storage device, or any combination thereof. The storage device 722 is accessible to the network entity 710. In some aspects, the storage device 722 may be integrated with the network entity 710 while in other aspects the storage device 722 may be separate from (and communicatively coupled to) the network entity 710.

Thus, the network entity 710 may "crowdsource" the measurements 714 to create the data 720. The data 720 includes multiple records, with each record including the measurements 714-M, the associated position 716-M, and the associated uncertainty 718-M. If the uncertainty 718-M associated with the position 716-M is less than or equal to a threshold, then the position 716-M may be referred to as "clean". If the uncertainty 718-M associated with the position 716-M is greater than the threshold, then the position 716-M may be referred to as "noisy".

The network entity 710 collects the measurements 708 (e.g., RFFPs) and uses positioning techniques using the position estimation module 712 to generate a noisy ground truth for each of the positions 716. The position estimation module 712 may determine line of sight (LOS) delay, multipath delays, angles and use a geometry-based model to determine the positions 716. The measurements 708 may be automatically collected using the UEs 104 and may be labeled with clean and accurate labels 730 captured over well-known locations. For example, the UEs 104, such as the vehicle 104-V or UAV 104-A, can be moved over the predefined routes 704 that have well-known positions to determine the positions 716 that are "clean" and have the uncertainty 718 below the threshold 725. The positions 716 that are noisy labels may have the uncertainty 718 that is greater than or equal to the threshold 725.

One or more selection criteria 724 may be used to select training data 726 from the data 720. Thus, the training data 726 may be a subset of the data 720. In some cases, the selection criteria 724 may include one or more thresholds 725. The training data 726 may be used by a training module 732 to train a machine learning algorithm 734 to create a machine learning module 736 (e.g., trained machine learning module). For example, the training data 726 may include features 728 derived from the measurement 714 and labels 730 derived from the position 716 used to train the machine learning module 736. The training data 726 may be a subset of the data 720 that is selected based on the selection criteria 724. The selection criteria 724 for selecting the training data 726 from the data 720 are briefly described in Table 1.

TABLE 1

| | |
|---|---|
| Option 1 | Use all collected data as training data |
| Option 2 | Select a subset of collected data where uncertainty is less than a threshold (e.g., clean data) as training data |
| Option 3 | Assign a weight to at least a portion of the data |
| Option 4 | Use a proximity constraint to select the training data |
| Option 5 | Combine two or more of Options 2, 3, and 4 |

In option 1, the collected data 720 is used as the training data 726 by the training module 732 to create the machine learning module 736. In option 2, the selection criteria 724 is used to select a portion of the data 720 in which the uncertainty 718 is less than the threshold 725 (also referred to as "clean" data). In this way, a portion of the data 720 that has relatively accurate (e.g., clean) positions 716 is selected as the training data 726, while other portions of the data 720 that have less accurate (e.g., also referred to as "noisy" data) positions 716, where the uncertainty 718 is greater than or equal to the threshold 725, are not selected.

In option 3, a weight may be assigned to each record in at least a portion of the records in the data 720 to create the training data 726. If the uncertainty 718-M is relatively low (e.g., lower than one of the thresholds 725), indicating that the corresponding position 716-M is relatively accurate, then the corresponding measurement 714-M and position 716-M may be assigned a higher weight (e.g., each weight is inversely proportional to the uncertainty). If the uncertainty 718-M is relatively high (e.g., greater than or equal to one of the thresholds 725), indicating that the corresponding position 716-M is less accurate, then the corresponding measurement 714-M and position 716-M may be assigned a lower weight. More specifically, in this case, all samples in the training data 726 may be used and the sample-selection stage can be overpassed. Soft weights can be utilized in various ways during the training process depending on how the training samples are composed for training. First, the weight (e.g., inverse of uncertainty) can be rescaled to be in the interval [0,1], and this is considered to be the soft weight. There are various methods to achieve this scaling, such as passing the weight to a scaled tanh, sigmoid function, SoftMax function, etc. As a first option, the soft weight can be used to scale the training loss function for each training sample. As a second option, the soft weights of the training samples in one batch can be used to scale the loss function of this batch using the weighted sum or the average of the soft weights. The soft weights can then be used to scale the loss function for the training batch.

In option 4, a proximity threshold of the thresholds 725 may be used to select a portion of the data 720 for use as the training data 726. The measurements 714 (e.g., RFFP) and the corresponding positions 716 for locations that are close to each other may not vary by more than the proximity threshold when spatially consistent. For example, assume a first building is adjacent to a second building. In this example, if the measurements 714-1 and the position 716-1 associated with the first building do not vary by more than the proximity threshold percentage from a measurement 714-2 and a position 716-2 (e.g., M=2) associated with the second building, then the measurements 714-1, 714-2 and the positions 716-1, 716-2 may be selected for inclusion in the training data 726. To illustrate, a first record and a second record may be selected from the data 720 for inclusion in the training data 726 based on determining that a measurement difference between a first measurement associated with the first record and a second measurement associated with the second record is proportional to a position difference between a first position associated with the first record and a second position associated with the second record. In this way, portions of the data 720 that are proximity-wise consistent may be selected for inclusion in the training data 726. In some aspects, semi-supervised learning methods may be used to select the portions of the data 720 data that are proximity-wise consistent for inclusion in the training data 726.

In option 5, a combination of two or more of options 2, 3, and 4 may be used as the selection criteria 724 to select the training data 726. For example, option 4 may be used to select data that is proximity-wise consistent and option 3 may be used to weight the data based on the proximity-based consistency.

The machine learning module 736 may use a type of machine learning, such as, neural networks (e.g., multi-layer perceptron or the like), support-vector machines, linear regression, logistic regression, naive Bayes, linear discriminant analysis, decision trees, K-nearest neighbors, another type of supervised or semi-supervised machine learning, or any combination thereof. After being initially trained, the machine learning module 736 may be included in UEs, network entities, or the like and used to determine (e.g., predict) a position based on measurement data (e.g., RFFP). The machine learning module 736 may be retrained as additional data is gathered. For example, the machine learning module 736 may be retrained at a periodic interval, such as every X weeks (where X>0) using the data 720.

Thus, data to train a machine learning algorithm may be gathered from UEs and vehicles. For example, the UEs and vehicles may capture and transmit measurements (e.g., RFFP or the like) that a network entity (e.g., gNB) receives. The network entity may use a position estimation module to determine a position associated with each measurement, using one or more techniques, such as, TDOA, ToF, Chan's method, Taylor's method, IEKF, SLAM, another type of technique, or any combination thereof. The measurements may be used as features and the positions may be used as labels to train a machine learning algorithm. In some cases, one or more criteria may be used to select a portion of the data that is used to train the machine learning algorithm. In this way, accurate labels (e.g., true positions) may be selected and used to train the machine learning algorithm. In some cases, different models may be trained based on device type, model type, software version, or any combination thereof. For example, a first model may be trained for a first type of device, a second model for a second type of device, and so on. As another example, a first model may be trained for a first software version, a second model may be trained for a second software version, and so on.

Figure 8:
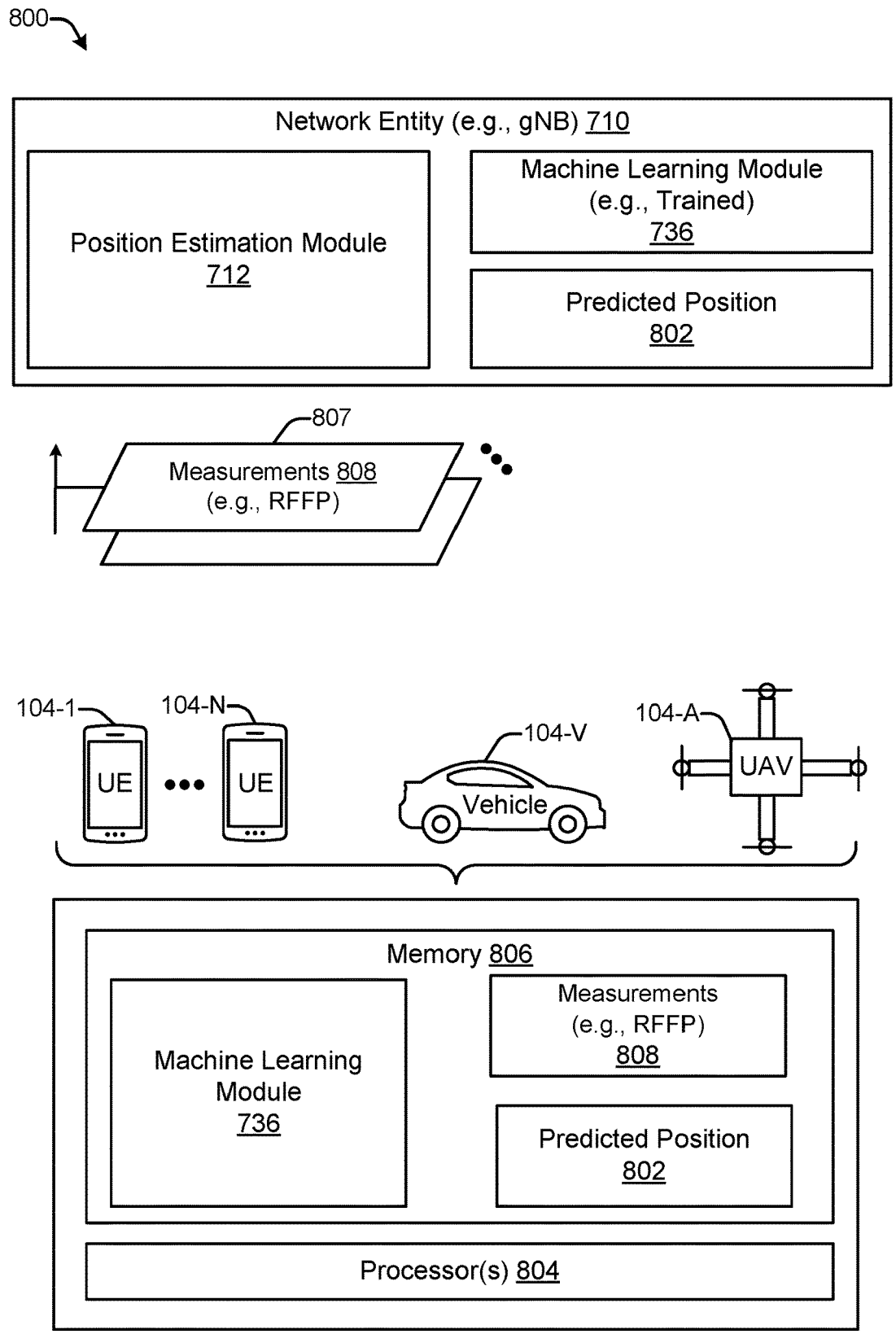
FIG. 8 illustrates an example wireless communication system in which a machine learning module is used to predict a position, according to aspects of the disclosure.

FIG. 8 illustrates an example wireless communication system 800 in which a machine learning module is used to predict a position, according to aspects of the disclosure. The machine learning module 736 that has been trained may be used to determine a predicted position 802 by one or more of the UEs 104, one or more vehicles, such as the representative vehicle 104-V, one or more UAVs, such as the representative UAV 104-A, one or more network entities, such as the representative network entity 710, or any combination thereof. For example, one or more of the UEs 104, the representative vehicle 104-V, and the representative UAV 104-A may include one or more processors 804 and a memory 806 that includes the machine learning module 736. The machine learning module 736 may use the measurements 808 captured by the UEs 104, the representative vehicle 104-V, and/or the representative UAV 104-A to determine the predicted position 802.

In the network entity 710, in some aspects, the position estimation module 712 may use the machine learning module 736, in addition to other techniques, to determine the predicted position 802. For example, after the network entity 710 receives a measurement message 807 that includes measurements 808 from one of the UEs 104, the representative vehicle 104-V, and/or the representative UAV 104-A, the network entity 710 may determine the predicted position 802 based on the measurements 808 using the machine learning module 736 executing in the network entity 710.

Thus, a machine learning module that is been trained using data may be used to determine a predicted position based on measurements captured by a UE or a vehicle. In this way, the UE or the vehicle is able to independently determine a position, e.g., without the use of other UEs, other vehicles, or network entities.

In an aspect, training the machine learning module may be server-based, but in other aspects, training may be server-assisted or even server-free (i.e., the training is purely performed by one or more involved UEs and/or gNBs). Training data with different certainty can be utilized for both initial model training and fine-tuning. For example, server-based training may be handled as follows. The server (e.g., LMF 270) will have an initial pretrained machine learning model that can be used across different scenarios and device types. This pretrained model can be trained initially using all data available, both with clean and noisy labels (i.e., with different certainty levels). For training with uncertain data, the threshold-based sample selection and/or soft weight technique can be applied. The amount of training data that would cover all possible scenarios and device types is large, and, thus, fine-tuning or model transfer becomes beneficial. The fine-tuning (i.e., model transfer) is a well-established concept in machine learning and is used to account for task-specific training. Initially, an initial model is trained on a subset of scenarios or device types and is known to perform very well. Then, fine-tuning is applied to a few layers/parameters in the machine learning model. The updated model becomes site- or device-specific, depending on how the additional training data are collected.

For fine-tuning, the server is most likely to know a rough estimation of UE location using classical methods. And, hence, to account for different scenarios (e.g., region-specific), the server may need to fine-tune the trained model with additional training data (clean and/or noisy) that are captured from the region of interest by the same or different devices. The server may also need to fine-tune the pretrained model to make it device-specific. In this case, additional training data can be requested for the device of interest. The amount of training data used for model fine-tuning is usually small and it can include both clean and noisy labels.

Figure 9:
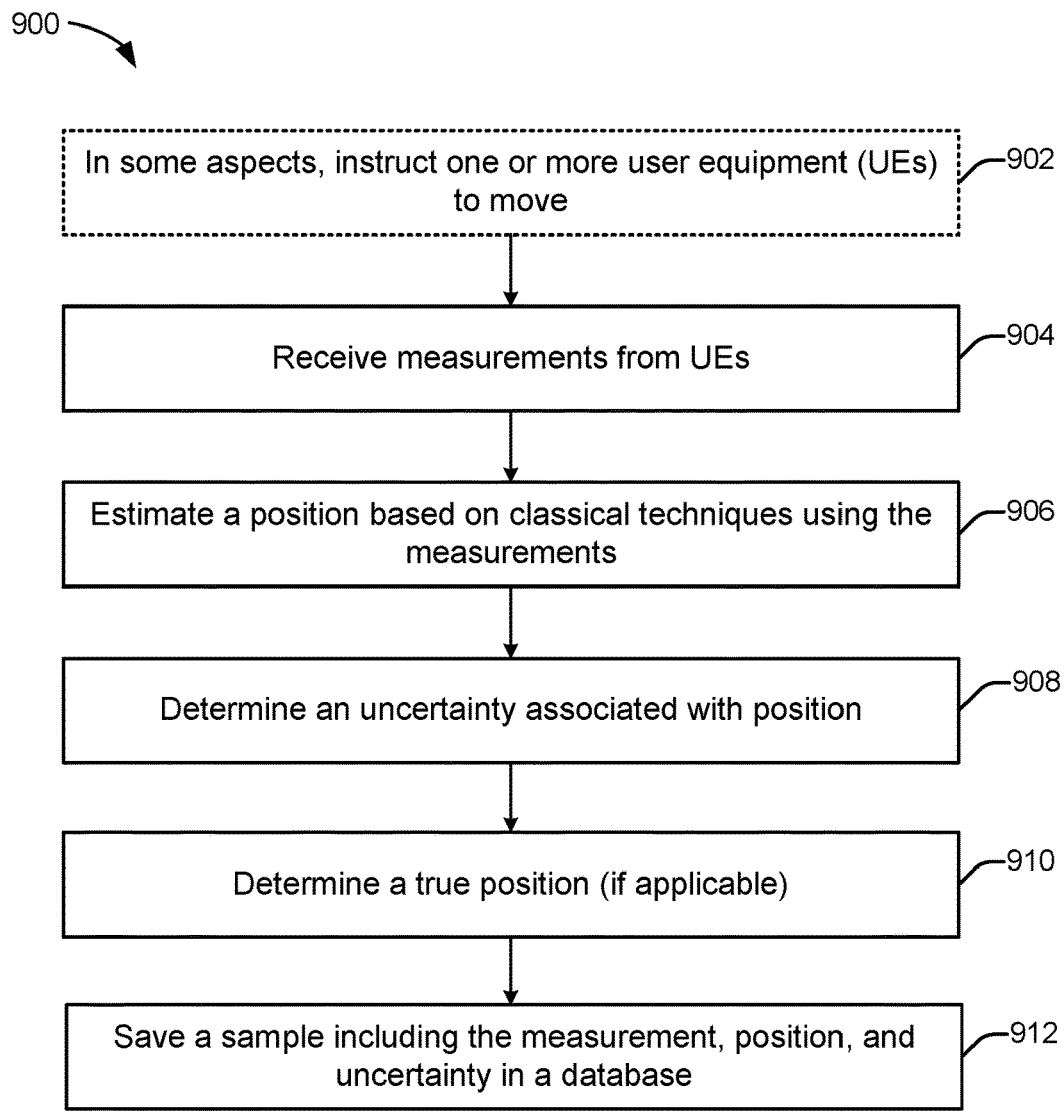
FIG. 9 illustrates a process that includes saving a measurement, a position, and an uncertainty in a database, according to aspects of the disclosure.
Figure 10:
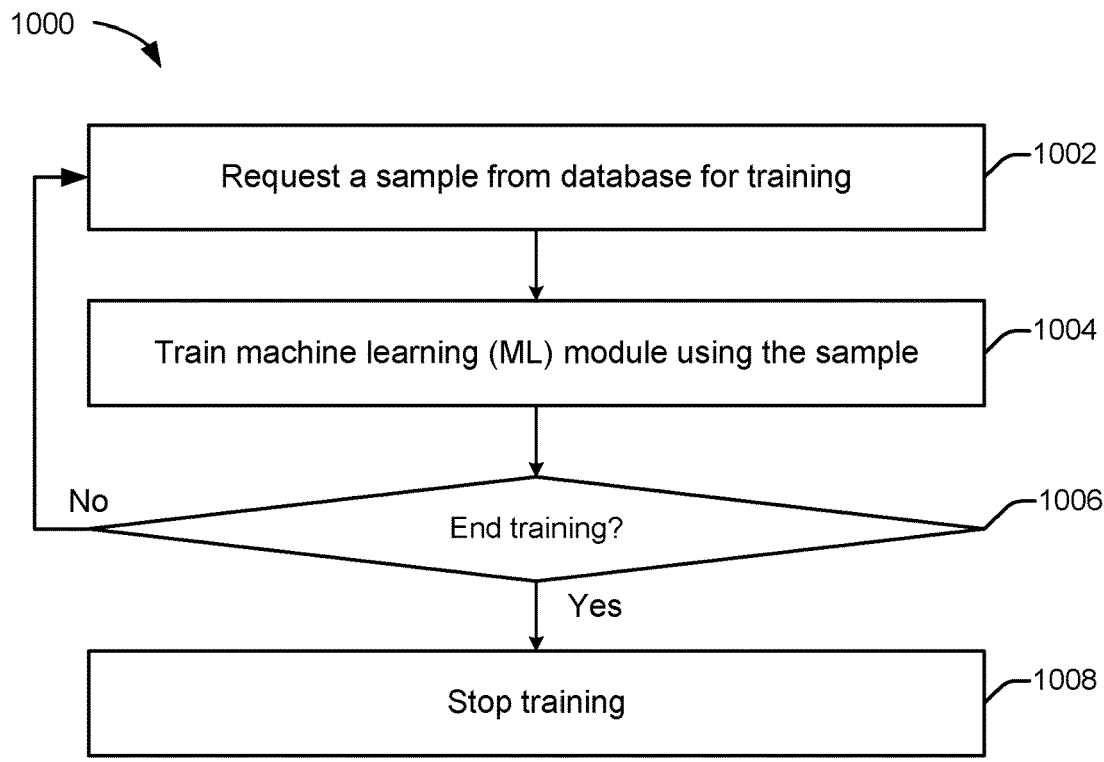
FIG. 10 illustrates a process to train a machine learning module, according to aspects of the disclosure.
Figure 11:
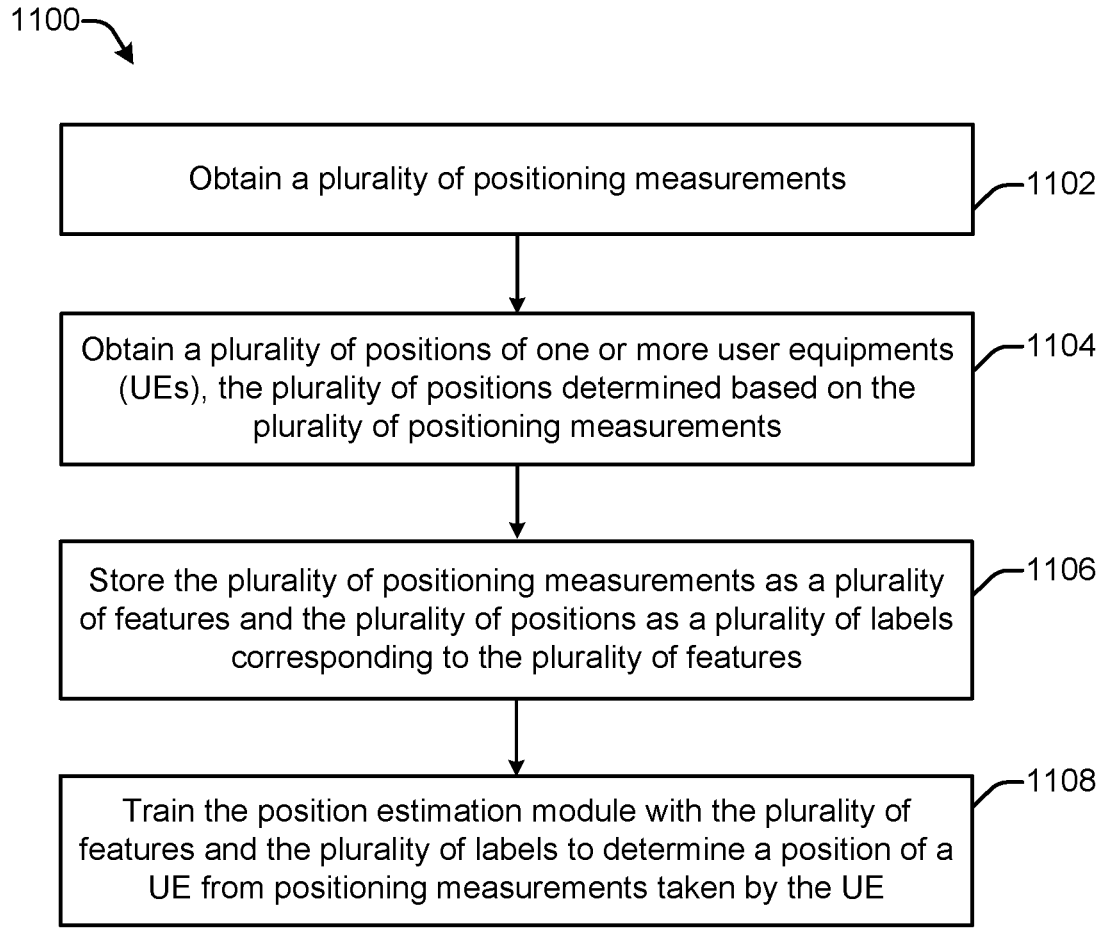
FIG. 11 illustrates a process for training a position estimation module, according to aspects of the disclosure.

In the flow diagram of FIGS. 9, 10, and 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 900, 1000, and 1100 are described with reference to FIGS. 1, 2, 3, 4, 5, 6, 7, and 8 as described above, although other models, frameworks, systems and environments may be used to implement this process FIG. 9 illustrates a process 900 that includes saving a sample in a database, according to aspects of the disclosure. The process 900 may be performed by the network entity 710 of FIGS. 7 and 8. In most cases, the UEs will move and provide measurements. In some cases, the network entity may instruct the UE to follow a particular route to obtain measurements.

At 902, in some aspects, the network entity may instruct one or more user equipments (UEs) to move. For example, in FIG. 7, the network entity 710 may instruct the vehicle 104-V to follow the ground route 704-V or instruct the UAV 104-A to follow the aerial route 704-A. Each UE 104, such as the vehicle 104-V or UAV 104-A, may move a distance at an angle. In an aspect, 902 may be performed by processor 384, memory 386, and transceivers 350, any or all of which may be considered means for performing this operation.

At 904, the network entity may receive measurements from the UEs. For example, in FIG. 7, the network entity 710 may receive the measurements 708 from one or more of the UEs 104. In an aspect, 904 may be performed by processor 384, memory 386, and transceivers 350 of FIG. 3B, any or all of which may be considered means for performing this operation.

At 906, the network entity may estimate a position based on classical techniques using the measurements. For example, in FIG. 7, the network entity 710 may determine the position 716 corresponding to the measurements 708 received from the UEs 104. In an aspect, 906 may be performed by processor 384, memory 386, and position estimation module 388 of FIG. 3B, any or all of which may be considered means for performing this operation.

At 908, the network entity may determine an uncertainty (u) associated with the position. For example, in FIG. 7, the network entity 710 may determine the uncertainty 718 associated with the position 716. In an aspect, 908 may be performed by processor 384, and memory 386 of FIG. 3B, any or all of which may be considered means for performing this operation.

At 910, the network entity may determine a true position (if applicable). For example, in FIG. 7, the network entity 710 may determine a true position of a particular object, such as the landmark 706, on the routes 704. In an aspect, 910 may be performed by processor 384 and memory 386 of FIG. 3B, any or all of which may be considered means for performing this operation.

At 912, the network entity may save a sample that includes the measurements, the position, and the uncertainty in a database. For example, in FIG. 7, the network entity 710 may store the measurements 714, the position 716, and the uncertainty 718 in the database 721. In an aspect, 912 may be performed by processor 384 and memory 386 of FIG. 3B, any or all of which may be considered means for performing this operation.

Thus, a network entity may receive measurements (e.g., RFFP) from UEs, determine a position associated with each measurement and an uncertainty associated with each position. For example, the network entity may determine the position using classical positioning techniques, such as TDOA, ToF, Chan's method, Taylor's method, IEKF, SLAM, another type of technique, or any combination thereof. A technical advantage of gathering data in this way to train a machine learning module is that a large amount of data can be quickly and easily gathered.

FIG. 10 illustrates a process 1000 to train a machine learning module, according to aspects of the disclosure. The process 1000 may be performed by the training module 732 of FIGS. 7 and 8 to create the machine learning module 736.

At 1002, the training module may request a sample from a database for training. For example, in FIG. 7, the training module 732 may request a sample (e.g., measurements 714-M, position 716-M, and uncertainty 718-M) of the data 720 from the database 721. In some aspects, the training module 732 may request a sample (e.g., a "clean" sample) that has the uncertainty 718 that is less than the threshold 725. In an aspect, 1002 may be performed by processor 384 and memory 386 of FIG. 3B, any or all of which may be considered means for performing this operation.

At 1004, the training module may train a machine learning module (e.g., a deep neural network or another type of machine learning module) using the sample. For example, in FIG. 7, the training module 732 may use the requested sample to train the machine learning algorithm 734 to create the machine learning module 736. In an aspect, 1004 may be performed by processor 384 and memory 386 of FIG. 3B, any or all of which may be considered means for performing this operation.

At 1006, the network entity may determine whether to end the training. If the network entity determines, at 1006, not to end the training, then the process 1000 proceeds to 1002, where the network entity requests an additional sample from the database. If the network entity determines, at 1006, to end the training, then the training is stopped, at 1008. For example, in FIG. 7, the training module 732 may determine whether the accuracy of the machine learning module 736 satisfies a particular one of the thresholds 725. If the training module 732 determines that the accuracy of the machine learning module 736 satisfies an accuracy threshold (e.g., of the thresholds 725), then the training module 732 stops training the machine learning module 736. If the training module 732 determines that the accuracy of the machine learning module 736 fails to satisfy the accuracy threshold, then the training module 732 requests another sample (e.g., measurements 714-M, position 716-M, uncertainty 718-M) from the database 721. In an aspect, 1006 and 1008 may be performed by processor 384 and memory 386 of FIG. 3B, any or all of which may be considered means for performing this operation.

Thus, a network entity may select a subset of the data for training the machine learning module by selecting "clean" data, e.g., data that has an associated uncertainty that is less than a threshold amount. A technical advantage of selecting "clean" data from the database is that the accuracy of the machine learning module can be adjusted based on the amount of uncertainty associated with the selected training data.

FIG. 11 illustrates a process 1100 for training a position estimation module, according to aspects of the disclosure. The process 1100 may be performed by a network entity, such as the network entity 710 of FIGS. 7 and 8.

At 1102, the network entity obtains a plurality of positioning measurements (e.g., from a UE, a base station, or another network entity). For example, in FIG. 7, the network entity 710 may receive the measurements 708 from one or more of the UEs 104 (including the representative vehicle 104-V and the representative UAV 104-A). In an aspect, where the network entity is a base station, operation 1102 may be performed by the one or more WWAN transceivers 350, the one or more network transceivers 380, the one or more processors 384, memory 386, and/or the position estimation module 388 of FIG. 3B, any or all of which may be considered means for performing this operation. Where the network entity is a server, operation 1102 may be performed by the one or more network transceivers 390, the one or more processors 394, memory 396, and/or the position estimation module 398 of FIG. 3C, any or all of which may be considered means for performing this operation.

At 1104, the network entity obtains a plurality of positions of one or more UEs, the plurality of positions determined based on the plurality of positioning measurements. For example, in FIG. 7, the network entity 710 may use the position estimation module 712 to determine the position 716 corresponding to the measurements 714. In an aspect, where the network entity is a base station, operation 1104 may be performed by the one or more WWAN transceivers 350, the one or more network transceivers 380, the one or more processors 384, memory 386, and/or the position estimation module 388 of FIG. 3B, any or all of which may be considered means for performing this operation. Where the network entity is a server, operation 1104 may be performed by the one or more network transceivers 390, the one or more processors 394, memory 396, and/or the position estimation module 398 of FIG. 3C, any or all of which may be considered means for performing this operation.

At 1106, the network entity stores the plurality of positioning measurements as a plurality of features and the plurality of positions as a plurality of labels corresponding to the plurality of features. For example, in FIG. 7, the network entity 710 may store the measurements 714, the associated position 716, and the associated uncertainty 718 as the data 720 in the database 721. The measurements 714 may be used as features and the positions 716 may be used as labels 730 by the training module 732 when training the machine learning algorithm 734 to create the machine learning module 736. In an aspect, where the network entity is a base station, operation 1106 may be performed by the one or more WWAN transceivers 350, the one or more network transceivers 380, the one or more processors 384, memory 386, and/or the position estimation module 388 of FIG. 3B, any or all of which may be considered means for performing this operation. Where the network entity is a server, operation 1106 may be performed by the one or more network transceivers 390, the one or more processors 394, memory 396, and/or the position estimation module 398 of FIG. 3C, any or all of which may be considered means for performing this operation.

At 1108, the network entity trains the position estimation module (e.g., a type of machine learning algorithm) with the plurality of features and the plurality of labels to determine a position of a UE from positioning measurements taken by the UE. For example, in FIG. 7, the training module 732 may train the machine learning algorithm 734 using the data 720 to configure the machine learning module 736. In an aspect, where the network entity is a base station, operation 1108 may be performed by the one or more WWAN transceivers 350, the one or more network transceivers 380, the one or more processors 384, memory 386, and/or the position estimation module 388 of FIG. 3B, any or all of which may be considered means for performing this operation. Where the network entity is a server, operation 1108 may be performed by the one or more network transceivers 390, the one or more processors 394, memory 396, and/or the position estimation module 398 of FIG. 3C, any or all of which may be considered means for performing this operation.

Thus, the trained machine learning module may be used by a UE (e.g., a smartphone, a vehicle, or the like) or a network entity to determine a predicted position based on radio frequency measurements such as, radio frequency fingerprints (RFFP), channel frequency response (CFR), channel impulse response (CIR), normalized histogram, or the like. A technical advantage that the trained machine learning module provides is that the UE, vehicle, or network entity is able to determine an accurate position based on the radio frequency measurements, without involving other UEs, other vehicles, or other network entities. Such a technical advantage is particularly useful in locations where other UEs, other vehicles, and other network entities are unavailable or inaccessible. For example, remote or rural locations may not have network access and there may be few or no other UEs present. The trained machine learning module enables UEs, vehicles, and network entities to accurately determine a position using radio frequency measurements.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method performed by a first network entity for training a position estimation module, the method comprising: obtaining a plurality of positioning measurements; obtaining a plurality of positions of one or more user equipments (UEs), the plurality of positions determined based on the plurality of positioning measurements; storing the plurality of positioning measurements as a plurality of features and the plurality of positions as a plurality of labels corresponding to the plurality of features; and training the position estimation module with the plurality of features and the plurality of labels to determine a position of a UE from positioning measurements taken by the UE.

Clause 2. The method of clause 1, wherein: obtaining the plurality of positioning measurements comprises receiving the plurality of positioning measurements from a second network entity, and obtaining the plurality of positions comprises determining the plurality of positions based on the plurality of positioning measurements.

Clause 3. The method of clause 2, wherein: the second network entity is one of the one or more UEs and at least a subset of the plurality of positioning measurements are based on sidelink signals exchanged between the one or more UEs, the second network entity is a base station and at least a subset of the plurality of positioning measurements are based on uplink signals transmitted by the one or more UEs, the second network entity is one UE of the one or more UEs and at least a subset of the plurality of positioning measurements are based on downlink signals measured by the one UE, or any combination thereof.

Clause 4. The method of any of clauses 2 to 3, wherein determining the plurality of positions comprises: determining at least a subset of the plurality of positions using a time difference of arrival technique; determining at least a subset of the plurality of positions using a time-of-flight technique; determining at least a subset of the plurality of positions using Chan's method; determining at least a subset of the plurality of positions using Taylor's method; determining at least a subset of the plurality of positions using an iterative extended Kalman filter; determining at least a subset of the plurality of positions using a simultaneous localization and mapping technique; or any combination thereof.

Clause 5. The method of clause 1, wherein: obtaining the plurality of positioning measurements comprises receiving the plurality of positioning measurements from a second network entity, and obtaining the plurality of positions comprises receiving the plurality of positions from the second network entity.

Clause 6. The method of any of clauses 1 to 5, wherein the plurality of positioning measurements comprises: a plurality of channel impulse response measurements; a plurality of channel frequency response measurements; a plurality of normalized histogram measurements; or any combination thereof.

Clause 7. The method of any of clauses 1 to 6, further comprising: selecting a subset of the plurality of features and the plurality of labels for which an uncertainty is less than an uncertainty threshold to train the position estimation module.

Clause 8. The method of any of clauses 1 to 7, further comprising: assigning a plurality of weights to the plurality of features and the plurality of labels included in each sample selected to train the position estimation module.

Clause 9. The method of clause 8, wherein each weight of the plurality of weights is inversely proportional to an uncertainty of a corresponding positioning measurement of the plurality of positioning measurements.

Clause 10. The method of any of clauses 1 to 9, further comprising: selecting a first record and a second record from the plurality of features and the plurality of labels for inclusion in training data based on determining that a measurement difference between a first measurement associated with the first record and a second measurement associated with the second record is proportional to a position difference between a first position associated with the first record and a second position associated with the second record.

Clause 11. The method of any of clauses 1 to 10, further comprising: selecting a plurality of samples based on determining that positioning measurements associated with each sample of the plurality of samples is proportional to a position associated with each sample of the plurality of samples.

Clause 12. The method of any of clauses 1 to 11, further comprising: re-training the position estimation module based on additional training data to create a re-trained position estimation module.

Clause 13. The method of any of clauses 1 to 12, further comprising: receiving the positioning measurements from the UE; and determining the position of the UE based on the positioning measurements using the position estimation module.

Clause 14. The method of any of clauses 1 to 13, further comprising: selecting a subset of the plurality of features and the plurality of labels for which an uncertainty is less than an uncertainty threshold; training the position estimation module using the subset of the plurality of features and the plurality of labels; determining an accuracy of the position estimation module; based on determining that the accuracy of the position estimation module is greater than or equal to an accuracy threshold, determining that training the position estimation module is completed; and based on determining that the accuracy of the position estimation module is less than the accuracy threshold, performing additional training of the position estimation module.

Clause 15. The method of any of clauses 1 to 14, further comprising: sending an instruction to at least one UE of the one or more UEs to travel a particular route that includes a landmark having a known position, wherein the at least one UE comprises an automated ground vehicle or an unmanned aerial vehicle (UAV).

Clause 16. A first network entity, comprising: a memory; at least one transceiver; and at least one processor communicatively coupled to the memory and the at least one transceiver, the at least one processor configured to: obtain a plurality of positioning measurements; obtain a plurality of positions of one or more user equipments (UEs), the plurality of positions determined based on the plurality of positioning measurements; store the plurality of positioning measurements as a plurality of features and the plurality of positions as a plurality of labels corresponding to the plurality of features; and train a position estimation module with the plurality of features and the plurality of labels to determine a position of a UE from positioning measurements taken by the UE.

Clause 17. The first network entity of clause 16, wherein: the at least one processor configured to obtain the plurality of positioning measurements comprises the at least one processor configured to receive, via the at least one transceiver, the plurality of positioning measurements from a second network entity, and the at least one processor configured to obtain the plurality of positions comprises the at least one processor configured to determine the plurality of positions based on the plurality of positioning measurements.

Clause 18. The first network entity of clause 17, wherein: the second network entity is one of the one or more UEs and at least a subset of the plurality of positioning measurements are based on sidelink signals exchanged between the one or more UEs, the second network entity is a base station and at least a subset of the plurality of positioning measurements are based on uplink signals transmitted by the one or more UEs, the second network entity is one UE of the one or more UEs and at least a subset of the plurality of positioning measurements are based on downlink signals measured by the one UE, or any combination thereof.

Clause 19. The first network entity of any of clauses 17 to 18, wherein the at least one processor configured to determine the plurality of positions comprises the at least one processor configured to: determine at least a subset of the plurality of positions using a time difference of arrival technique; determine at least a subset of the plurality of positions using a time-of-flight technique; determine at least a subset of the plurality of positions using Chan's method; determine at least a subset of the plurality of positions using Taylor's method; determine at least a subset of the plurality of positions using an iterative extended Kalman filter; determine at least a subset of the plurality of positions using a simultaneous localization and mapping technique; or any combination thereof.

Clause 20. The first network entity of clause 16, wherein: the at least one processor configured to obtain the plurality of positioning measurements comprises the at least one processor configured to receive, via the at least one transceiver, the plurality of positioning measurements from a second network entity, and the at least one processor configured to obtain the plurality of positions comprises the at least one processor configured to receive, via the at least one transceiver, the plurality of positions from the second network entity.

Clause 21. The first network entity of any of clauses 16 to 20, wherein the plurality of positioning measurements comprises: a plurality of channel impulse response measurements; a plurality of channel frequency response measurements; a plurality of normalized histogram measurements; or any combination thereof.

Clause 22. The first network entity of any of clauses 16 to 21, wherein the at least one processor is further configured to: select a subset of the plurality of features and the plurality of labels for which an uncertainty is less than an uncertainty threshold to train the position estimation module.

Clause 23. The first network entity of any of clauses 16 to 22, wherein the at least one processor is further configured to: assign a plurality of weights to the plurality of features and the plurality of labels included in each sample selected to train the position estimation module.

Clause 24. The first network entity of clause 23, wherein each weight of the plurality of weights is inversely proportional to an uncertainty of a corresponding positioning measurement of the plurality of positioning measurements.

Clause 25. The first network entity of any of clauses 16 to 24, wherein the at least one processor is further configured to: select a first record and a second record from the plurality of features and the plurality of labels for inclusion in training data based on determining that a measurement difference between a first measurement associated with the first record and a second measurement associated with the second record is proportional to a position difference between a first position associated with the first record and a second position associated with the second record.

Clause 26. The first network entity of any of clauses 16 to 25, wherein the at least one processor is further configured to: select a plurality of samples based on determining that positioning measurements associated with each sample of the plurality of samples is proportional to a position associated with each sample of the plurality of samples.

Clause 27. The first network entity of any of clauses 16 to 26, wherein the at least one processor is further configured to: re-train the position estimation module based on additional training data to create a re-trained position estimation module.

Clause 28. The first network entity of any of clauses 16 to 27, wherein the at least one processor is further configured to: receive, via the at least one transceiver, the positioning measurements from the UE; and determine the position of the UE based on the positioning measurements using the position estimation module.

Clause 29. The first network entity of any of clauses 16 to 28, wherein the at least one processor is further configured to: select a subset of the plurality of features and the plurality of labels for which an uncertainty is less than an uncertainty threshold; train the position estimation module using the subset of the plurality of features and the plurality of labels; determine an accuracy of the position estimation module; determine, based on determining that the accuracy of the position estimation module is greater than or equal to an accuracy threshold, that training the position estimation module is completed; and perform, based on determining that the accuracy of the position estimation module is less than the accuracy threshold, additional training of the position estimation module.

Clause 30. The first network entity of any of clauses 16 to 29, wherein the at least one processor is further configured to: send, via the at least one transceiver, an instruction to at least one UE of the one or more UEs to travel a particular route that includes a landmark having a known position, wherein the at least one UE comprises an automated ground vehicle or an unmanned aerial vehicle (UAV).

Clause 31. A first network entity, comprising: means for obtaining a plurality of positioning measurements; means for obtaining a plurality of positions of one or more user equipments (UEs), the plurality of positions determined based on the plurality of positioning measurements; means for storing the plurality of positioning measurements as a plurality of features and the plurality of positions as a plurality of labels corresponding to the plurality of features; and means for training a position estimation module with the plurality of features and the plurality of labels to determine a position of a UE from positioning measurements taken by the UE.

Clause 32. The first network entity of clause 31, wherein: the means for obtaining the plurality of positioning measurements comprises means for receiving the plurality of positioning measurements from a second network entity, and the means for obtaining the plurality of positions comprises means for determining the plurality of positions based on the plurality of positioning measurements.

Clause 33. The first network entity of clause 32, wherein: the second network entity is one of the one or more UEs and at least a subset of the plurality of positioning measurements are based on sidelink signals exchanged between the one or more UEs, the second network entity is a base station and at least a subset of the plurality of positioning measurements are based on uplink signals transmitted by the one or more UEs, the second network entity is one UE of the one or more UEs and at least a subset of the plurality of positioning measurements are based on downlink signals measured by the one UE, or any combination thereof.

Clause 34. The first network entity of any of clauses 32 to 33, wherein the means for determining the plurality of positions comprises: means for determining at least a subset of the plurality of positions using a time difference of arrival technique; means for determining at least a subset of the plurality of positions using a time-of-flight technique; means for determining at least a subset of the plurality of positions using Chan's method; means for determining at least a subset of the plurality of positions using Taylor's method; means for determining at least a subset of the plurality of positions using an iterative extended Kalman filter; means for determining at least a subset of the plurality of positions using a simultaneous localization and mapping technique; or any combination thereof.

Clause 35. The first network entity of clause 31, wherein: the means for obtaining the plurality of positioning measurements comprises means for receiving the plurality of positioning measurements from a second network entity, and the means for obtaining the plurality of positions comprises means for receiving the plurality of positions from the second network entity.

Clause 36. The first network entity of any of clauses 31 to 35, wherein the plurality of positioning measurements comprises: a plurality of channel impulse response measurements; a plurality of channel frequency response measurements; a plurality of normalized histogram measurements; or any combination thereof.

Clause 37. The first network entity of any of clauses 31 to 36, further comprising: means for selecting a subset of the plurality of features and the plurality of labels for which an uncertainty is less than an uncertainty threshold to train the position estimation module.

Clause 38. The first network entity of any of clauses 31 to 37, further comprising: means for assigning a plurality of weights to the plurality of features and the plurality of labels included in each sample selected to train the position estimation module.

Clause 39. The first network entity of clause 38, wherein each weight of the plurality of weights is inversely proportional to an uncertainty of a corresponding positioning measurement of the plurality of positioning measurements.

Clause 40. The first network entity of any of clauses 31 to 39, further comprising: means for selecting a first record and a second record from the plurality of features and the plurality of labels for inclusion in training data based on determining that a measurement difference between a first measurement associated with the first record and a second measurement associated with the second record is proportional to a position difference between a first position associated with the first record and a second position associated with the second record.

Clause 41. The first network entity of any of clauses 31 to 40, further comprising: means for selecting a plurality of samples based on determining that positioning measurements associated with each sample of the plurality of samples is proportional to a position associated with each sample of the plurality of samples.

Clause 42. The first network entity of any of clauses 31 to 41, further comprising: means for re-training the position estimation module based on additional training data to create a re-trained position estimation module.

Clause 43. The first network entity of any of clauses 31 to 42, further comprising: means for receiving the positioning measurements from the UE; and means for determining the position of the UE based on the positioning measurements using the position estimation module.

Clause 44. The first network entity of any of clauses 31 to 43, further comprising: means for selecting a subset of the plurality of features and the plurality of labels for which an uncertainty is less than an uncertainty threshold; means for training the position estimation module using the subset of the plurality of features and the plurality of labels; means for determining an accuracy of the position estimation module; means for determining that training the position estimation module is completed; and means for performing additional training of the position estimation module.

Clause 45. The first network entity of any of clauses 31 to 44, further comprising: means for sending an instruction to at least one UE of the one or more UEs to travel a particular route that includes a landmark having a known position, wherein the at least one UE comprises an automated ground vehicle or an unmanned aerial vehicle (UAV).

Clause 46. A non-transitory computer-readable medium storing computer-executable instructions that, when executed by a first network entity, cause the first network entity to: obtain a plurality of positioning measurements; obtain a plurality of positions of one or more user equipments (UEs), the plurality of positions determined based on the plurality of positioning measurements; store the plurality of positioning measurements as a plurality of features and the plurality of positions as a plurality of labels corresponding to the plurality of features; and train a position estimation module with the plurality of features and the plurality of labels to determine a position of a UE from positioning measurements taken by the UE.

Clause 47. The non-transitory computer-readable medium of clause 46, wherein: the computer-executable instructions that, when executed by the first network entity, cause the first network entity to obtain the plurality of positioning measurements comprise computer-executable instructions that, when executed by the first network entity, cause the first network entity to receive the plurality of positioning measurements from a second network entity, and the computer-executable instructions that, when executed by the first network entity, cause the first network entity to obtain the plurality of positions comprise computer-executable instructions that, when executed by the first network entity, cause the first network entity to determine the plurality of positions based on the plurality of positioning measurements.

Clause 48. The non-transitory computer-readable medium of clause 47, wherein: the second network entity is one of the one or more UEs and at least a subset of the plurality of positioning measurements are based on sidelink signals exchanged between the one or more UEs, the second network entity is a base station and at least a subset of the plurality of positioning measurements are based on uplink signals transmitted by the one or more UEs, the second network entity is one UE of the one or more UEs and at least a subset of the plurality of positioning measurements are based on downlink signals measured by the one UE, or any combination thereof.

Clause 49. The non-transitory computer-readable medium of any of clauses 47 to 48, wherein the computer-executable instructions that, when executed by the first network entity, cause the first network entity to determine the plurality of positions comprise computer-executable instructions that, when executed by the first network entity, cause the first network entity to: determine at least a subset of the plurality of positions using a time difference of arrival technique; determine at least a subset of the plurality of positions using a time-of-flight technique; determine at least a subset of the plurality of positions using Chan's method; determine at least a subset of the plurality of positions using Taylor's method; determine at least a subset of the plurality of positions using an iterative extended Kalman filter; determine at least a subset of the plurality of positions using a simultaneous localization and mapping technique; or any combination thereof.

Clause 50. The non-transitory computer-readable medium of clause 46, wherein: the computer-executable instructions that, when executed by the first network entity, cause the first network entity to obtain the plurality of positioning measurements comprise computer-executable instructions that, when executed by the first network entity, cause the first network entity to receive the plurality of positioning measurements from a second network entity, and the computer-executable instructions that, when executed by the first network entity, cause the first network entity to obtain the plurality of positions comprise computer-executable instructions that, when executed by the first network entity, cause the first network entity to receive the plurality of positions from the second network entity.

Clause 51. The non-transitory computer-readable medium of any of clauses 46 to 50, wherein the plurality of positioning measurements comprises: a plurality of channel impulse response measurements; a plurality of channel frequency response measurements; a plurality of normalized histogram measurements; or any combination thereof.

Clause 52. The non-transitory computer-readable medium of any of clauses 46 to 51, further comprising instructions that, when executed by the first network entity, further cause the first network entity to: select a subset of the plurality of features and the plurality of labels for which an uncertainty is less than an uncertainty threshold to train the position estimation module.

Clause 53. The non-transitory computer-readable medium of any of clauses 46 to 52, further comprising instructions that, when executed by the first network entity, further cause the first network entity to: assign a plurality of weights to the plurality of features and the plurality of labels included in each sample selected to train the position estimation module.

Clause 54. The non-transitory computer-readable medium of clause 53, wherein each weight of the plurality of weights is inversely proportional to an uncertainty of a corresponding positioning measurement of the plurality of positioning measurements.

Clause 55. The non-transitory computer-readable medium of any of clauses 46 to 54, further comprising instructions that, when executed by the first network entity, further cause the first network entity to: select a first record and a second record from the plurality of features and the plurality of labels for inclusion in training data based on determining that a measurement difference between a first measurement associated with the first record and a second measurement associated with the second record is proportional to a position difference between a first position associated with the first record and a second position associated with the second record.

Clause 56. The non-transitory computer-readable medium of any of clauses 46 to 55, further comprising instructions that, when executed by the first network entity, further cause the first network entity to: select a plurality of samples based on determining that positioning measurements associated with each sample of the plurality of samples is proportional to a position associated with each sample of the plurality of samples.

Clause 57. The non-transitory computer-readable medium of any of clauses 46 to 56, further comprising instructions that, when executed by the first network entity, further cause the first network entity to: re-train the position estimation module based on additional training data to create a re-trained position estimation module.

Clause 58. The non-transitory computer-readable medium of any of clauses 46 to 57, further comprising instructions that, when executed by the first network entity, further cause the first network entity to: receive the positioning measurements from the UE; and determine the position of the UE based on the positioning measurements using the position estimation module.

Clause 59. The non-transitory computer-readable medium of any of clauses 46 to 58, further comprising instructions that, when executed by the first network entity, further cause the first network entity to: select a subset of the plurality of features and the plurality of labels for which an uncertainty is less than an uncertainty threshold; train the position estimation module using the subset of the plurality of features and the plurality of labels; determine an accuracy of the position estimation module; determine that training the position estimation module is completed; and perform additional training of the position estimation module.

Clause 60. The non-transitory computer-readable medium of any of clauses 46 to 59, further comprising instructions that, when executed by the first network entity, further cause the first network entity to: send an instruction to at least one UE of the one or more UEs to travel a particular route that includes a landmark having a known position, wherein the at least one UE comprises an automated ground vehicle or an unmanned aerial vehicle (UAV).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a digital signal processor (DSP), an application specific integrated circuit (ASIC), a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a digital signa processor (DSP) and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a compact disc (CD) ROM, optical disc, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a base station for training a position estimation module in the base station, the method comprising:

obtaining a plurality of positioning measurements;
obtaining a plurality of positions and their corresponding uncertainties of one or more user equipments (UEs), the plurality of positions and the corresponding uncertainties determined based on the plurality of positioning measurements;
storing the plurality of positioning measurements as a plurality of features and the plurality of positions as a plurality of labels corresponding to the plurality of features;
selecting a subset of the plurality of features and the plurality of labels based on the corresponding uncertainties and an uncertainty threshold;
assigning a plurality of weights to the plurality of features and the plurality of labels included in the selected subset of the plurality of features and the plurality of labels, wherein each weight of the plurality of weights is inversely proportional to the uncertainty of a corresponding position of the plurality of positions; and
training the position estimation module in a processor and/or memory in the base station, with the selected subset of the plurality of features and the plurality of labels, based, at least in part, on the assigned weights, to determine a position of a UE from positioning measurements taken by the UE.

2. The method of claim 1, wherein:
obtaining the plurality of positioning measurements comprises receiving the plurality of positioning measurements from one of the one or more UEs or a second base station, and
obtaining the plurality of positions and the corresponding uncertainties comprises determining the plurality of positions and the corresponding uncertainties based on the plurality of positioning measurements.

3. The method of claim 2, wherein receiving the plurality of positioning measurements from the one of the one or more UEs or the base station comprises:
receiving the plurality of positioning measurements from the one of the one or more UEs and at least a subset of the plurality of positioning measurements are based on sidelink signals exchanged between the one or more UEs,
receiving the plurality of positioning measurements from the base station and at least a subset of the plurality of positioning measurements are based on uplink signals transmitted by the one or more UEs,
receiving the plurality of positioning measurements from the one UE of the one or more UEs and at least a subset of the plurality of positioning measurements are based on downlink signals measured by the one UE, or
any combination thereof.

4. The method of claim 2, wherein determining the plurality of positions and the corresponding uncertainties comprises:
determining at least a subset of the plurality of positions and the corresponding uncertainties using a time difference of arrival technique;
determining at least a subset of the plurality of positions and the corresponding uncertainties using a time-of-flight technique;
determining at least a subset of the plurality of positions and the corresponding uncertainties using Chan's method;
determining at least a subset of the plurality of positions and the corresponding uncertainties using Taylor's method;
determining at least a subset of the plurality of positions and the corresponding uncertainties using an iterative extended Kalman filter;
determining at least a subset of the plurality of positions and the corresponding uncertainties using a simultaneous localization and mapping technique; or
any combination thereof.

5. The method of claim 1, wherein:
obtaining the plurality of positioning measurements comprises receiving the plurality of positioning measurements from one of the one or more UEs or a base station, and
obtaining the plurality of positions and the corresponding uncertainties comprises receiving the plurality of positions and the corresponding uncertainties from the second network entity the one of the one or more UEs or the base station.

6. The method of claim 1, wherein the plurality of positioning measurements comprises:
a plurality of channel impulse response measurements;
a plurality of channel frequency response measurements;
a plurality of normalized histogram measurements; or
any combination thereof.

7. The method of claim 1, wherein selecting comprises:
selecting the subset of the plurality of features and the plurality of labels for which the uncertainty is less than the uncertainty threshold to train the position estimation module in the base station.

8. The method of claim 1, further comprising:
selecting a first record and a second record from the plurality of features and the plurality of labels for inclusion in training data based on determining that a measurement difference between a first measurement associated with the first record and a second measurement associated with the second record is proportional to a position difference between a first position associated with the first record and a second position associated with the second record.

9. The method of claim 1, further comprising:
selecting a plurality of samples based on determining that positioning measurements associated with each sample of the plurality of samples is proportional to a position associated with each sample of the plurality of samples.

10. The method of claim 1, further comprising:
re-training the position estimation module in the base station based on additional training data to create a re-trained position estimation module in the base station.

11. The method of claim 1, further comprising:
receiving the positioning measurements from the UE; and
determining the position and the corresponding uncertainties of the UE based on the positioning measurements using the position estimation module in the base station.

12. The method of claim 1, further comprising:
determining an accuracy of the position estimation module in the base station;
based on determining that the accuracy of the position estimation module in the base station is greater than or equal to an accuracy threshold, determining that training the position estimation module in the base station is completed; and
based on determining that the accuracy of the position estimation module in the base station is less than the accuracy threshold, performing additional training of the position estimation module in the base station.

13. The method of claim 1, further comprising:
sending an instruction to at least one UE of the one or more UEs to travel a particular route that includes a landmark having a known position, wherein the at least one UE comprises an automated ground vehicle or an unmanned aerial vehicle (UAV).

14. A base station, comprising:
one or more memories;
one or more transceivers; and
one or more processors communicatively coupled to the one or more memories and the one or more transceivers, the one or more processors, either alone or in combination, configured to:
obtain a plurality of positioning measurements;
obtain a plurality of positions and their corresponding uncertainties of one or more user equipments (UEs), the plurality of positions and the corresponding uncertainties determined based on the plurality of positioning measurements;
store the plurality of positioning measurements as a plurality of features and the plurality of positions as a plurality of labels corresponding to the plurality of features;
select a subset of the plurality of features and the plurality of labels based on the corresponding uncertainties and an uncertainty threshold;
assign a plurality of weights to the plurality of features and the plurality of labels included in the selected subset of the plurality of features and the plurality of labels, wherein each weight of the plurality of weights is inversely proportional to the uncertainty of a corresponding position of the plurality of positions; and
train the position estimation module in a processor and/or memory in the base station, with the selected subset of the plurality of features and the plurality of labels, based, at least in part, on the assigned weights, to determine a position of a UE from positioning measurements taken by the UE.

15. The base station of claim 14, wherein:
obtain the plurality of positioning measurements comprises receiving the plurality of positioning measurements from one of the one or more UEs or a second base station, and
obtain the plurality of positions and the corresponding uncertainties comprises determining the plurality of positions and the corresponding uncertainties based on the plurality of positioning measurements.

16. The base station of claim 15, wherein the one or more processors configured to receive the plurality of positioning measurements from the one of the one or more UEs or the base station comprises the one or more processors, either alone or in combination, configured to:
receive, via the one or more transceivers, the plurality of positioning measurements from the one of the one or more UEs and at least a subset of the plurality of positioning measurements are based on sidelink signals exchanged between the one or more UEs,
receive, via the one or more transceivers, the plurality of positioning measurements from the base station and at least a subset of the plurality of positioning measurements are based on uplink signals transmitted by the one or more UEs,
receive, via the one or more transceivers, the plurality of positioning measurements from the one UE of the one or more UEs and at least a subset of the plurality of positioning measurements are based on downlink signals measured by the one UE, or
any combination thereof.

17. The base station of claim 15, wherein the one or more processors configured to determine the plurality of positions and the corresponding uncertainties comprises the one or more processors, either alone or in combination, configured to:
determine at least a subset of the plurality of positions and the corresponding uncertainties using a time difference of arrival technique;
determine at least a subset of the plurality of positions and the corresponding uncertainties using a time-of-flight technique;
determine at least a subset of the plurality of positions and the corresponding uncertainties using Chan's method;
determine at least a subset of the plurality of positions and the corresponding uncertainties using Taylor's method;
determine at least a subset of the plurality of positions and the corresponding uncertainties using an iterative extended Kalman filter;
determine at least a subset of the plurality of positions and the corresponding uncertainties using a simultaneous localization and mapping technique; or
any combination thereof.

18. The base station of claim 14, wherein:
the one or more processors configured to obtain the plurality of positioning measurements comprises the one or more processors, either alone or in combination, configured to receive, via the one or more transceivers, the plurality of positioning measurements from one of the one or more UEs or a base station, and
the one or more processors configured to obtain the plurality of positions and the corresponding uncertainties comprises the one or more processors, either alone or in combination, configured to receive, via the one or more transceivers, the plurality of positions and the corresponding uncertainties from the second network entity the one of the one or more UEs or the base station.

19. The base station of claim 14, wherein the plurality of positioning measurements comprises:
a plurality of channel impulse response measurements;
a plurality of channel frequency response measurements;
a plurality of normalized histogram measurements; or
any combination thereof.

20. The base station of claim 14, wherein the one or more processors configured to select comprises the one or more processors, either alone or in combination, configured to:
select the subset of the plurality of features and the plurality of labels for which the uncertainty is less than the uncertainty threshold to train the position estimation module in the base station.

21. The base station of claim 14, wherein the one or more processors, either alone or in combination, are further configured to:
select a first record and a second record from the plurality of features and the plurality of labels for inclusion in training data based on determining that a measurement difference between a first measurement associated with the first record and a second measurement associated with the second record is proportional to a position difference between a first position associated with the first record and a second position associated with the second record.

22. The base station of claim 14, wherein the one or more processors, either alone or in combination, are further configured to:
  select a plurality of samples based on determining that positioning measurements associated with each sample of the plurality of samples is proportional to a position associated with each sample of the plurality of samples.

23. The base station of claim 14, wherein the one or more processors, either alone or in combination, are further configured to:
  re-train the position estimation module in the base station based on additional training data to create a re-trained position estimation module in the base station.

24. The base station of claim 14, wherein the one or more processors, either alone or in combination, are further configured to:
  receive, via the one or more transceivers, the positioning measurements from the UE; and
  determine the position and the corresponding uncertainties of the UE based on the positioning measurements using the position estimation module in the base station.

25. The base station of claim 14, wherein the one or more processors, either alone or in combination, are further configured to:
  determine an accuracy of the position estimation module in the base station;
  determine, based on a determination that the accuracy of the position estimation module in the base station is greater than or equal to an accuracy threshold, that training the position estimation module in the base station is completed; and
  perform, based on a determination that the accuracy of the position estimation module in the base station is less than the accuracy threshold, additional training of the position estimation module in the base station.

26. The base station of claim 14, wherein the one or more processors, either alone or in combination, are further configured to:
  send, via the one or more transceivers, an instruction to at least one UE of the one or more UEs to travel a particular route that includes a landmark having a known position, wherein the at least one UE comprises an automated ground vehicle or an unmanned aerial vehicle (UAV).

27. A base station, comprising:
  means for obtaining a plurality of positioning measurements;
  means for obtaining a plurality of positions and their corresponding uncertainties of one or more user equipments (UEs), the plurality of positions and the corresponding uncertainties determined based on the plurality of positioning measurements;
  means for storing the plurality of positioning measurements as a plurality of features and the plurality of positions as a plurality of labels corresponding to the plurality of features;
  means for selecting a subset of the plurality of features and the plurality of labels based on the corresponding uncertainties and an uncertainty threshold;
  means for assigning a plurality of weights to the plurality of features and the plurality of labels included in the selected subset of the plurality of features and the plurality of labels, wherein each weight of the plurality of weights is inversely proportional to the uncertainty of a corresponding position of the plurality of positions; and
  means for training the position estimation module in a processor and/or memory in the base station, with the selected subset of the plurality of features and the plurality of labels, based, at least in part, on the assigned weights, to determine a position of a UE from positioning measurements taken by the UE.

28. The base station of claim 27, wherein:
  the means for obtaining the plurality of positioning measurements comprise means for receiving the plurality of positioning measurements from one of the one or more UEs or a second base station, and
  the means for obtaining the plurality of positions and the corresponding uncertainties comprise means for determining the plurality of positions and the corresponding uncertainties based on the plurality of positioning measurements.

29. The base station of claim 27, wherein:
  the means for obtaining the plurality of positioning measurements comprise means for receiving the plurality of positioning measurements from one of the one or more UEs or a base station, and
  the means for obtaining the plurality of positions and the corresponding uncertainties comprise means for receiving the plurality of positions and the corresponding uncertainties from the second network entity the one of the one or more UEs or the base station.

30. A non-transitory computer-readable medium storing computer-executable instructions that, when executed by a base station, cause the base station to:
  obtain a plurality of positioning measurements;
  obtain a plurality of positions and their corresponding uncertainties of one or more user equipments (UEs), the plurality of positions and the corresponding uncertainties determined based on the plurality of positioning measurements;
  store the plurality of positioning measurements as a plurality of features and the plurality of positions as a plurality of labels corresponding to the plurality of features;
  select a subset of the plurality of features and the plurality of labels based on the corresponding uncertainties and an uncertainty threshold;
  assign a plurality of weights to the plurality of features and the plurality of labels included in the selected subset of the plurality of features and the plurality of labels, wherein each weight of the plurality of weights is inversely proportional to the uncertainty of a corresponding position of the plurality of positions; and
  train the position estimation module in a processor and/or memory in the base station, with the selected subset of the plurality of features and the plurality of labels, based, at least in part, on the assigned weights, to determine a position of a UE from positioning measurements taken by the UE.

* * * * *